(12) United States Patent
Høriuchi et al.

(10) Patent No.: US 6,498,406 B1
(45) Date of Patent: Dec. 24, 2002

(54) POWER SOURCE CONTAINING RECHARGEABLE BATTERIES

(75) Inventors: Tatsuhito Høriuchi, Sumoto (JP); Yoshiharu Takasaki, Ibi-Gun (JP); Kazuo Osaki, Mihara-Gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/493,096

(22) Filed: Jan. 28, 2000

(30) Foreign Application Priority Data

Jan. 29, 1999 (JP) .......................................... 11-022028
Apr. 1, 1999 (JP) .......................................... 11-094634

(51) Int. Cl.$^7$ ................................................. H01M 2/10
(52) U.S. Cl. ........................ 307/150; 429/120; 361/692
(58) Field of Search ............................. 307/150; 429/71, 429/99, 120, 27, 34, 82, 83, 62, 148, 26; 320/107, 15, 30, 48, 150; 361/690, 692, 695, 694

(56) References Cited

U.S. PATENT DOCUMENTS

| | | | |
|---|---|---|---|
| 4,840,855 A | * 6/1989 | Foti et al. ................... 429/120 |
| 5,414,591 A | * 5/1995 | Kimura et al. ............. 361/695 |
| 5,424,915 A | * 6/1995 | Katooka et al. ........... 361/695 |
| 5,428,503 A | * 6/1995 | Matsushima et al. ....... 361/695 |
| 5,432,026 A | * 7/1995 | Sahm et al. ................ 429/120 |
| 5,447,807 A | * 9/1995 | Peled et al. .................... 429/62 |
| 5,456,994 A | * 10/1995 | Mita .......................... 429/148 |
| 5,571,630 A | * 11/1996 | Cheiky ........................ 429/27 |
| 5,585,204 A | * 12/1996 | Oshida et al. ............... 429/62 |
| 5,639,571 A | * 6/1997 | Waters et al. ............... 429/120 |
| 5,680,030 A | * 10/1997 | Kadouchi et al. ............. 320/15 |
| 5,800,942 A | * 9/1998 | Hamada et al. ............. 429/148 |
| 5,824,432 A | * 10/1998 | Currle ......................... 429/120 |
| 5,866,276 A | * 2/1999 | Ogami et al. ............... 429/120 |
| 5,879,831 A | * 3/1999 | Ovshinsky et al. ......... 429/120 |
| 5,879,833 A | * 3/1999 | Yoshii et al. ................. 429/62 |
| 6,007,942 A | * 12/1999 | Mistry ........................ 429/100 |
| 6,110,612 A | * 8/2000 | Walsh .......................... 429/99 |
| 6,218,807 B1 | * 4/2001 | Sakaue et al. .............. 320/107 |
| 6,222,729 B1 | * 4/2001 | Yoshikawa .................. 361/690 |
| 6,225,788 B1 | * 5/2001 | Kouzu et al. ............... 320/150 |
| 6,226,180 B1 | * 5/2001 | Ueda et al. .................. 361/690 |
| 6,242,121 B1 | * 6/2001 | Pedicini et al. .............. 429/27 |
| 6,365,296 B1 | * 4/2002 | Young .......................... 429/82 |

FOREIGN PATENT DOCUMENTS

| | | | |
|---|---|---|---|
| DE | 3942470 A1 | * | 6/1990 |
| EP | 1 026 770 | | 8/2000 |
| FR | 2789231 | * | 1/2000 |
| JP | 10-270095 | | 10/1998 |
| WO | 01/17055 A1 | * | 3/2001 |
| WO | 01/22522 A1 | * | 3/2001 |

* cited by examiner

*Primary Examiner*—Brian Sircus
*Assistant Examiner*—Roberto J. Rios
(74) *Attorney, Agent, or Firm*—Wenderoth, Lind & Ponack, L.L.P.

(57) ABSTRACT

A power source is provided with a holder-case housing a plurality of slender power modules. Cooling-air passes through on the surfaces of power modules by passing air through the holder-case. An air-duct is formed in the holder-case and intermediate air-inlets are opened in a central portion of the air-duct. A plurality of rows of power modules housed in the holder-case are cooled by the air inhaled from the intermediate air-inlets.

11 Claims, 30 Drawing Sheets

POWER SOURCE CONTAINING RECHARGEABLE BATTERIES

This application is based on Japanese Application No. 22028 filed on Jan. 29, 1999, and Japanese Application No. 94634 filed on Apr. 1, 1999 in Japan, the contents of which are incorporated hereinto by reference.

BACKGROUND OF THE INVENTION

This invention relates to a high current power source used primarily to power a drive motor for automobiles such as hybrid and electric automobiles.

A high current power source used to power an automobile drive motor achieves high output voltage by connecting power modules in series. This is for the purpose of increasing drive motor output. In a power source used for this type of application, an extremely high current passes through batteries. For example, in hybrid automobiles, an extremely high current passes through batteries when staring and accelerating. This is because the automobiles are accelerated by the output of the batteries. In addition, high current also passes through batteries when rapidly charging in a short time.

The high current power source requires compulsory cooling when the temperature of the batteries rises. In a power source in which a plurality of rows of power modules arranged in a lateral fashion are housed in a holder-case, it is important to cool each power module equally. If a difference in temperature is produced in the batteries, high temperature batteries will easily deteriorate in efficiency.

For example, the structure for housing a plurality of power modules in a holder-case and cooling each power module equally is described in Japanese Non-examined Patent Publication HEI 10-270095 (1998). As shown in the cross-section view of FIG. 1, a holder-case 102 described in the Publication is provided with an air-inlet 1035 in the lower part and an air-outlet 1036 in the upper part, and allows cooling of power modules 101 by letting air flow from the air-inlet 1035 in the lower part into the air-outlet 1036 in the upper part. Cooling adjustment fins 1047 are provided within the holder-case 102 to adjust the air speed flowing on the surface of the power modules 101.

A holder-case with this structure makes the air speed flowing on the surface of power modules provided in the upper part higher than the air speed flowing on the surface of power modules provided in the lower part. If the air speeds flowing on the surfaces of the upper and lower power modules are the same, the lower power modules are cooled more effectively than the upper power modules since the temperature of air flowing on the surface of the lower power modules is lower than the temperature of air flowing on the surface of the upper power modules, and thereby the difference in temperature is produced.

Gaps between cooling adjustment fins and power modules are formed to be gradually narrower toward the upper part to make the air speed flowing on the surface of power modules in the upper part higher than the air speed flowing in the lower part. This is because air speed becomes higher when gaps are formed to be narrower.

A power source with this structure can cool the upper and lower power modules because the lower power modules are cooled by low temperature air and the upper modules are cooled by rapid flowing air. However, in this structure, it is extremely difficult to cool the upper and lower power modules under the same conditions. This is because cooling-air temperature of lower power modules is low and cooling-air temperature of the upper power modules is high. Even if the air speed flowing on the surface of upper power modules is increased, it is difficult to cool the upper power modules efficiently, due to the high temperature air, like the lower power modules are cooled. For this reason, power modules provided near an air-inlet can be cooled efficiently, however power modules provided near an air-outlet can not be cooled efficiently. This type of power resource has the drawback that the difference in temperature is produced. Thus, the power modules provided near the air-outlet may easily deteriorate in efficiency.

The present invention was developed to resolve these types of problems with prior art power sources. Thus it is a primary object of the present invention to provide a power source that can cool all of the whole power modules housed in the holder-case equally and efficiently, and prevent batteries from deteriorating in efficiency due to the difference in temperature.

The above and further objects and features of the invention will more fully be apparent from the following detailed description with accompanying drawings.

SUMMARY OF THE INVENTION

The power source of the present invention is provided with a holder-case in which a plurality of rows of slender power modules are housed in a parallel fashion. The power modules are cooled by passing air through the holder-case.

Further, the power source of the present invention is provided with a main air inlet on one end and an air-outlet on the other end. An air-duct is formed between the air-inlet and the air-outlet. The air-duct is provided with intermediate air-inlets for supplying air to the air-duct. In this power source, both the main air-inlet and intermediate air-inlets supply air to the air-duct to cool a plurality of rows of power modules housed in the holder-case.

A power source of this structure has the feature all of the power modules housed in the holder-case can be cooled equally and batteries can be prevented from deteriorating in efficiency due to the difference in temperature. The power source can cool all of the power modules equally and efficiently by both the main air-inlets and intermediate air-inlets air supply to the air-duct.

Further, in the power source of the present invention, air-outlets can be provided at both ends of a holder-case and intermediate air-inlets, which pass through the holder-case, can be provided on the way of the air-duct. By this, air flows into an air-duct disposed in the holder-case through the intermediate air-inlets. The air flowing into the air-duct compulsorily cools a plurality of power modules disposed in the air-duct.

A power source with this structure has the feature that all of the power modules housed in the holder-case can be cooled equally and efficiently and batteries can be prevented from deteriorating in efficiency due to by the difference in temperature. Especially, the power source with this structure can cool power modules housed in the middle of the holder-case efficiently by passing cold air through the middle part of the holder-case, which is considered to be the most difficult to cool, from the intermediate air-inlets.

DETAILED DESCRIPTION OF THE INVENTION

Figure 1:
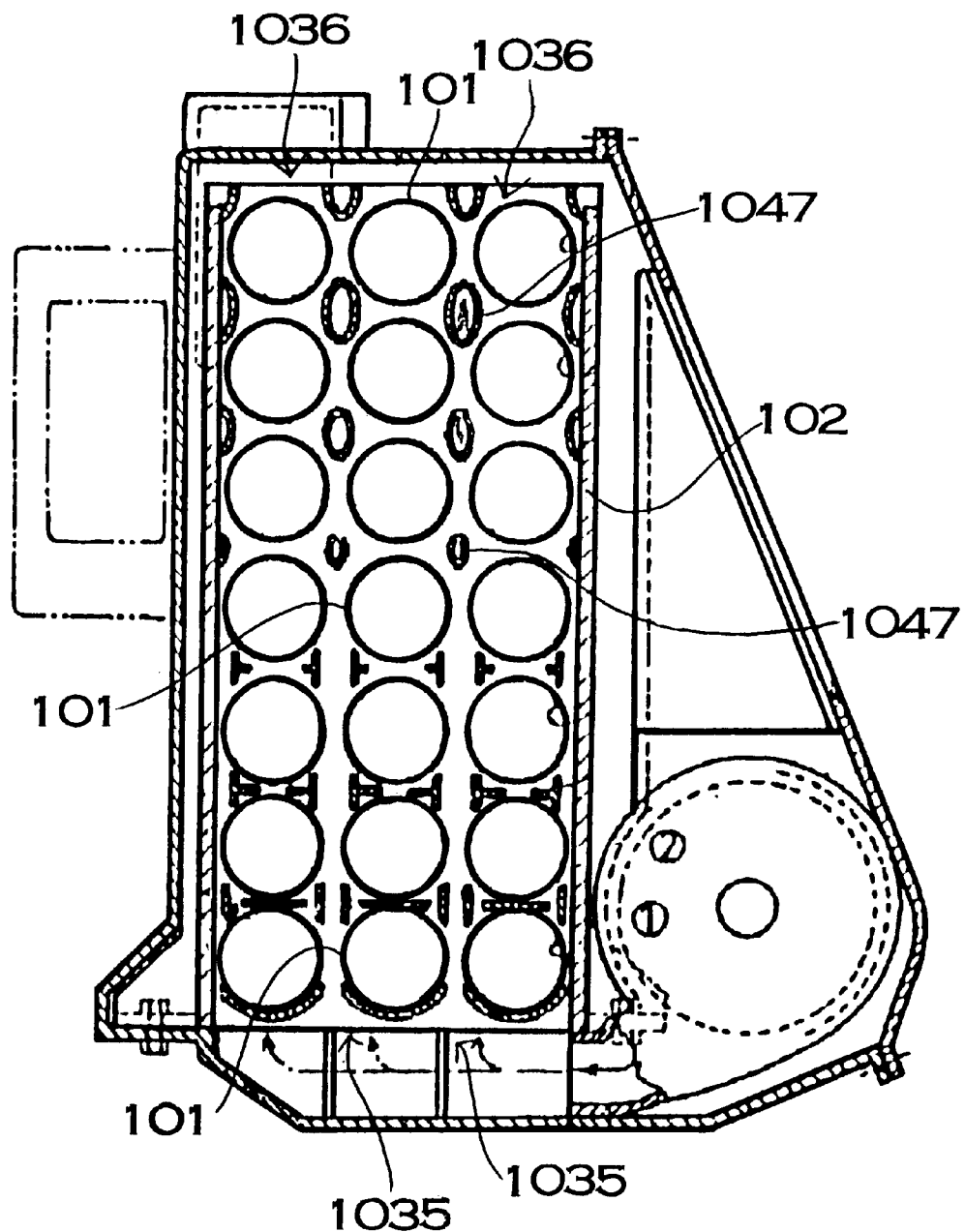
FIG. 1 is a cross-section view showing a prior art power source.
Figure 2:
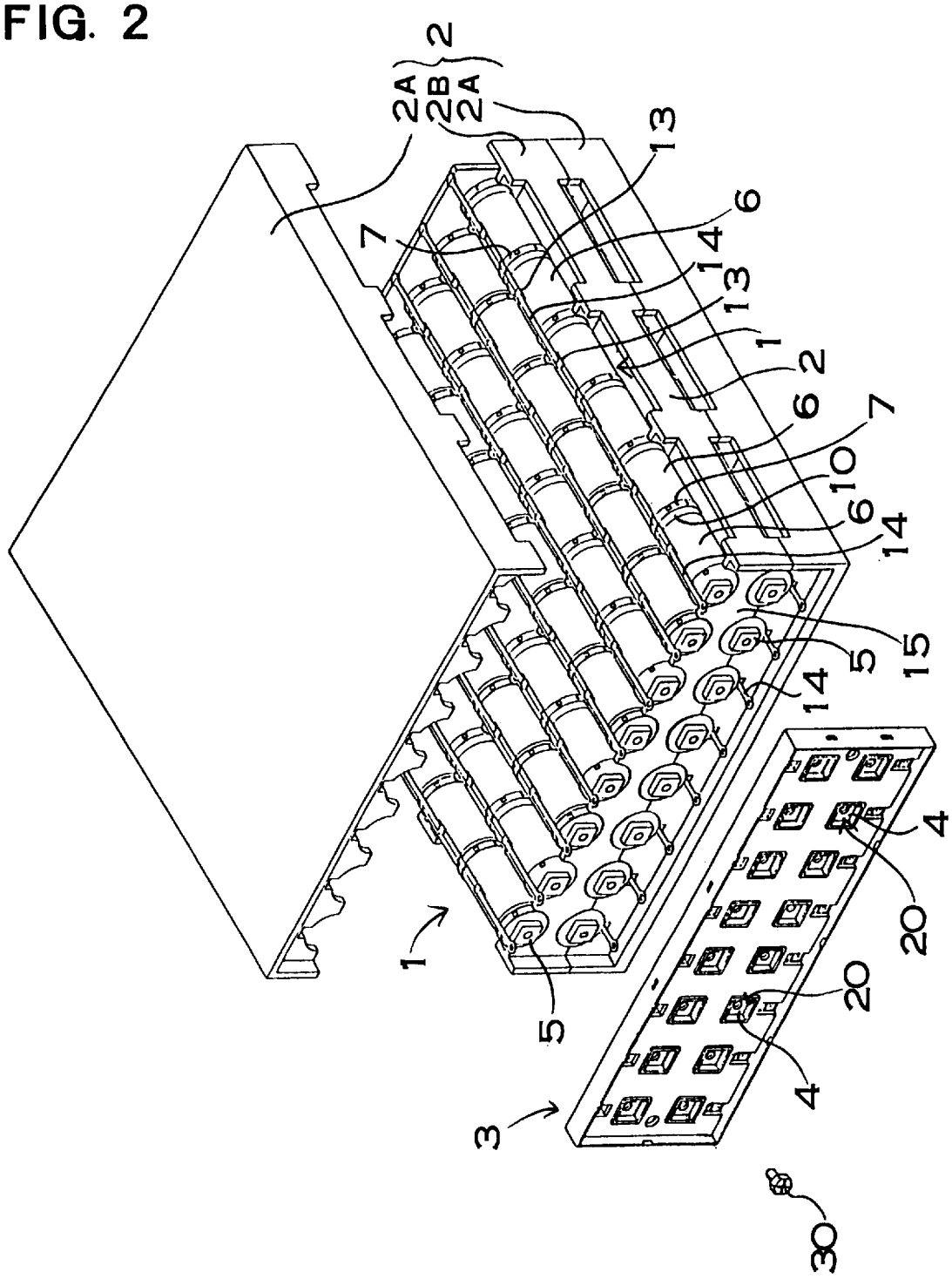
FIG. 2 is an exploded perspective view showing an embodiment of the power source of the present invention.
Figure 3:
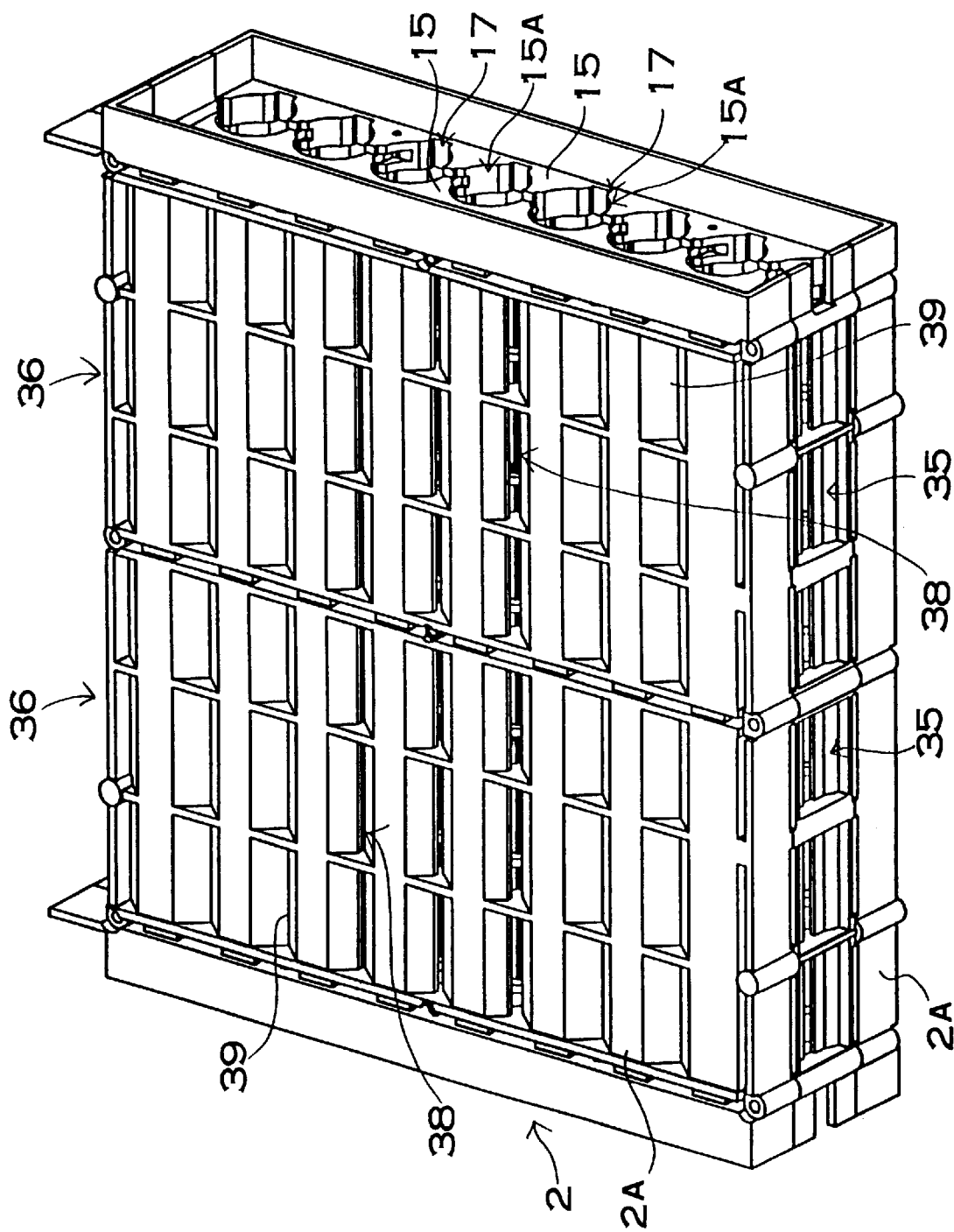
FIG. 3 is an enlarged perspective view showing a surface shape of the holder-case of the power source shown in FIG. 2.

As shown in FIG. 2, the power source is provided with a holder-case 2 to hold a plurality of power modules 1 with parallel orientation, pass bars 4 located in end regions of the holder-case 2 and screw-fastened to electrode terminals 5 provided at the ends of the power modules 1 housed within the holder-case 2, and end-plates 3 attached at end regions of the holder-case 2 with pass bars 4 disposed infixed positions. However, the upper surface of the holder-case 2 in this figure is not illustrated with precision. As shown in FIG. 3, the upper surface of the holder-case 2 is formed to be rough.

A power module 1 has a plurality of rechargeable batteries or large capacitance super-capacitors joined in a linear fashion. The power modules 1 of FIG. 2 have six series-connected rechargeable batteries 6 joined in a straight line. A power module using super-capacitors has a plurality of super-capacitors electrically connected in parallel. However, a power module 1 may also be made up of a single rechargeable battery or super-capacitor. The powermodules 1 shown in FIG. 2 have circular cylindrical rechargeable batteries 6 joined in a straight line by dish-shaped connectors 7. Positive and negative electrode terminals 5 are connected at the ends of a power module 1.

Figure 4:
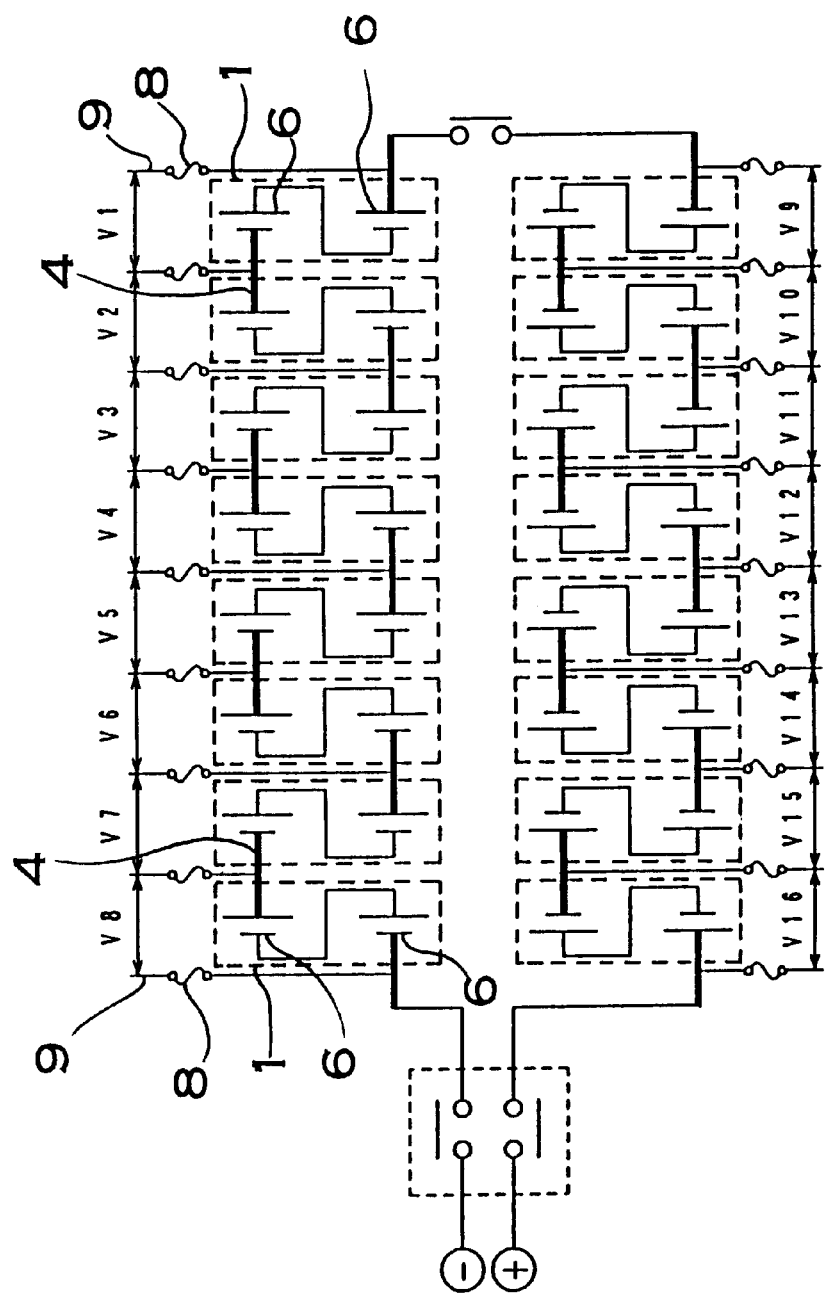
FIG. 4 is a circuit diagram showing an embodiment of the power source of the present invention.

Turning to FIG. 4, a circuit diagram of the power source shown in FIG. 2 is shown. The power source shown in FIG. 4 houses 2 levels of 8 rows of power modules 1, and each power module 1 is electrically connected in series. Pass bars 4, which connect power modules 1, are connected via fuses 8 to leads 9 for measuring power module 1 voltage.

Figure 5:
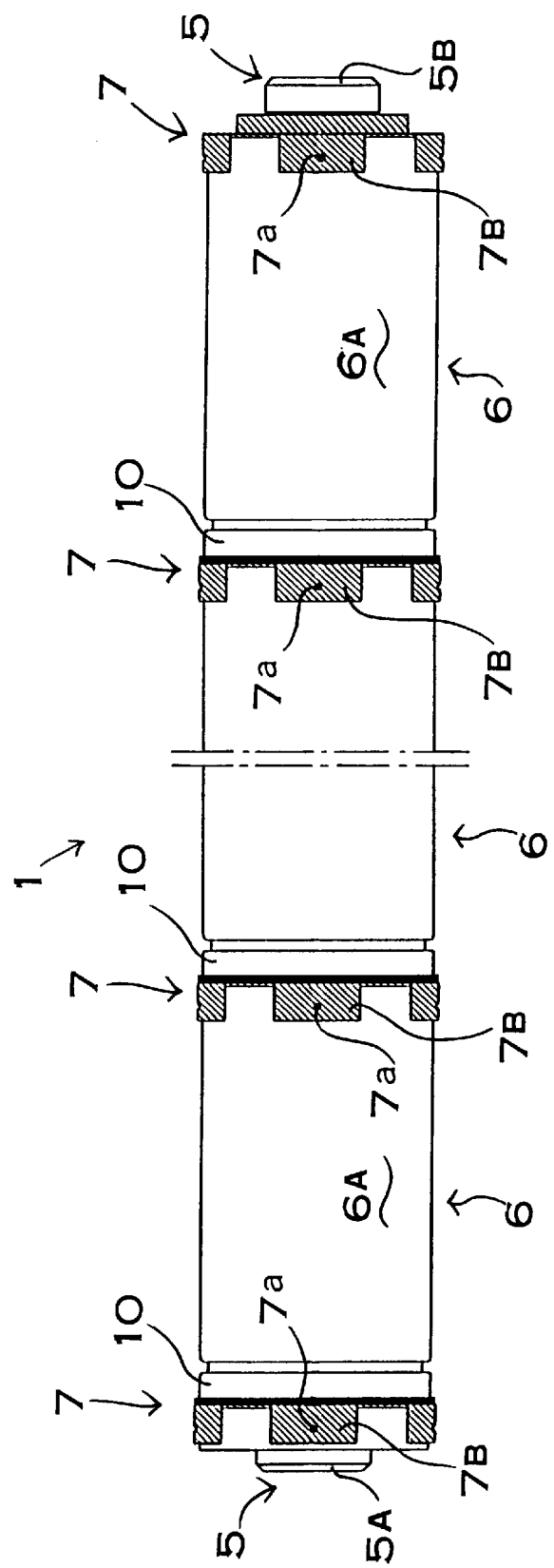
FIG. 5 is a side view of a power module housed within the power source shown in FIG. 2.
Figure 6:
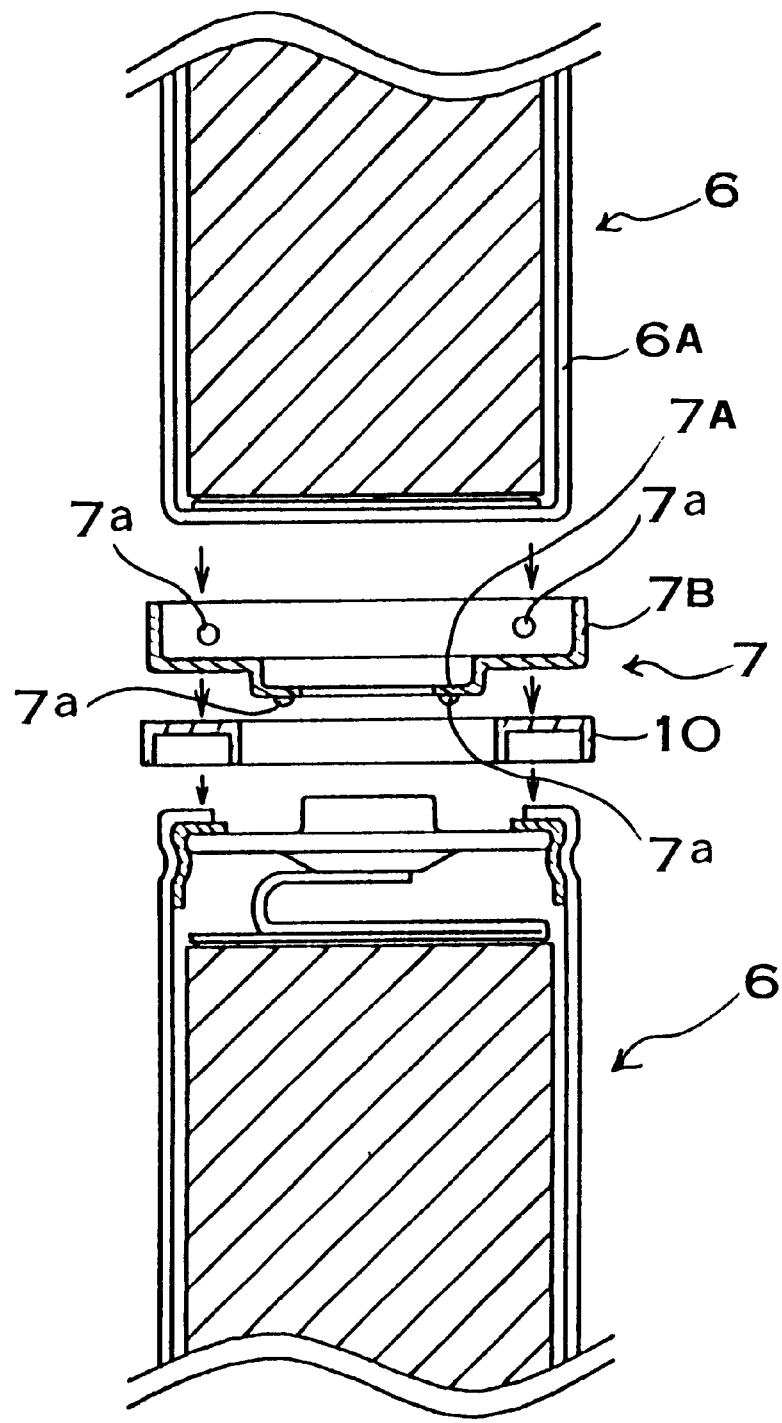
FIG. 6 is an exploded cross-section view showing the connecting structure for batteries of the power module shown in FIG. 5.

Turning to FIGS. 5 and 6, the structure for connecting batteries 6 in a straight line with dish-shaped connectors 7 is shown. In a power module 1 of this structure, a disk region 7A of a dish-shaped connector 7 is weld-connected to the positive terminal of a circular cylindrical battery 6. The disk region 7A of the dish-shaped connector 7 is provided with projections 7a for welding to the positive terminal of the circular cylindrical battery 6. When the projections 7a of the dish-shaped connector 7 are welded to the positive terminal, welding electrode rods push on the top surfaces of the projections 7a. To prevent short circuits between the dish-shaped connector 7 and the circular cylindrical battery 6, a ring-shaped insulator 10 is sandwiched between the dish-shaped connector 7 and the circular cylindrical battery 6.

In addition, a circular cylindrical battery 6 is inserted into the dish-shaped connector 7 flange region 7B to connect the negative terminal of the circular cylindrical battery 6, which is its outer case 6A, with the flange region 7B. Similar to the disk region 7A, the flange region 7B also has projections 7a provided on its inner surface for welding to the battery outer case 6A. During welding, welding electrode rods push on the outsides of the flange region 7B projections 7a.

Figure 7:
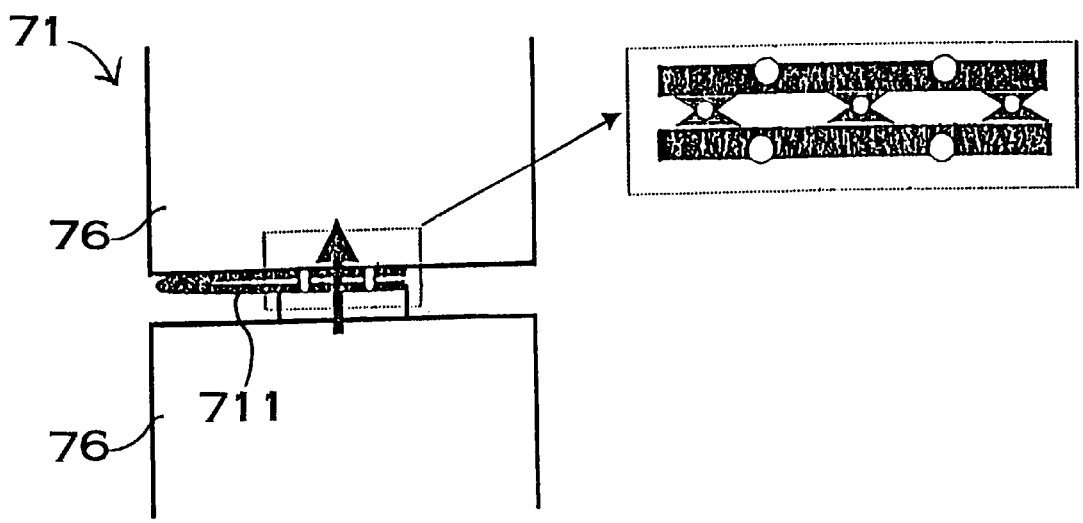
FIG. 7 is a cross-section view showing an example of another power module battery connecting structure.

As shown in the cross-section view of FIG. 7, series-connected batteries 6 can be joined without using dish-shaped connectors 7 by weld-connection to opposing sides of lead-plates 711 bent in U-shapes. In the power module 71 of FIG. 7, opposing sides of U-shaped lead-plates 711 are welded by passing a high current pulse through batteries 76 in the direction of battery discharge. For example, lead-plates 711 can be welded by passing a high current pulse of 1 KA for approximately 15 msec.

Figure 8:
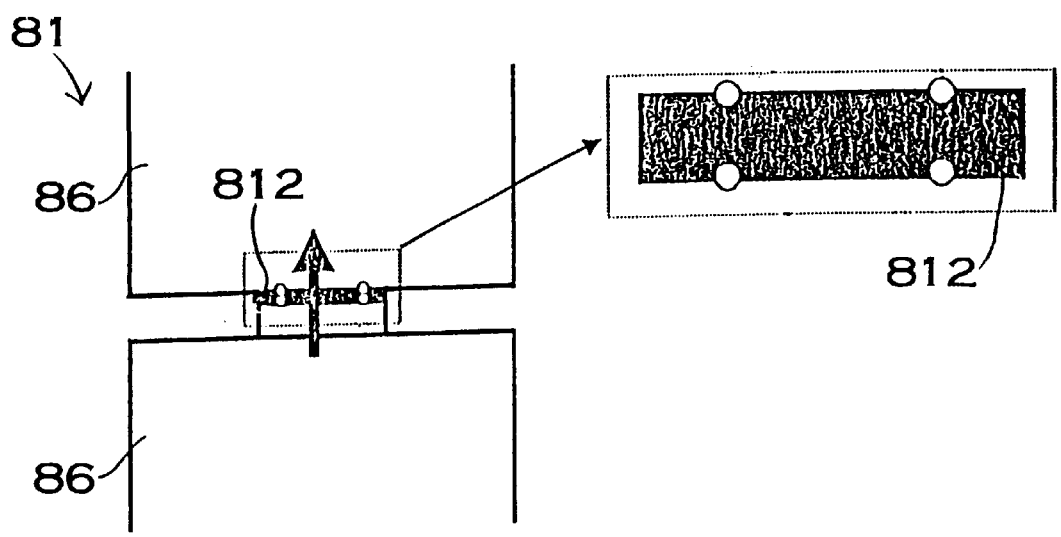
FIG. 8 is a cross-section view showing an example of another power module battery connecting structure.

Further, as shown in the cross-section of FIG. 8, metal plates 812 can be sandwiched between positive and negative battery 86 terminals, and a high current pulse can be passed through the batteries 86 in their direction of discharge to weld the metal plates 812 to the battery 86 terminals.

Figure 9:
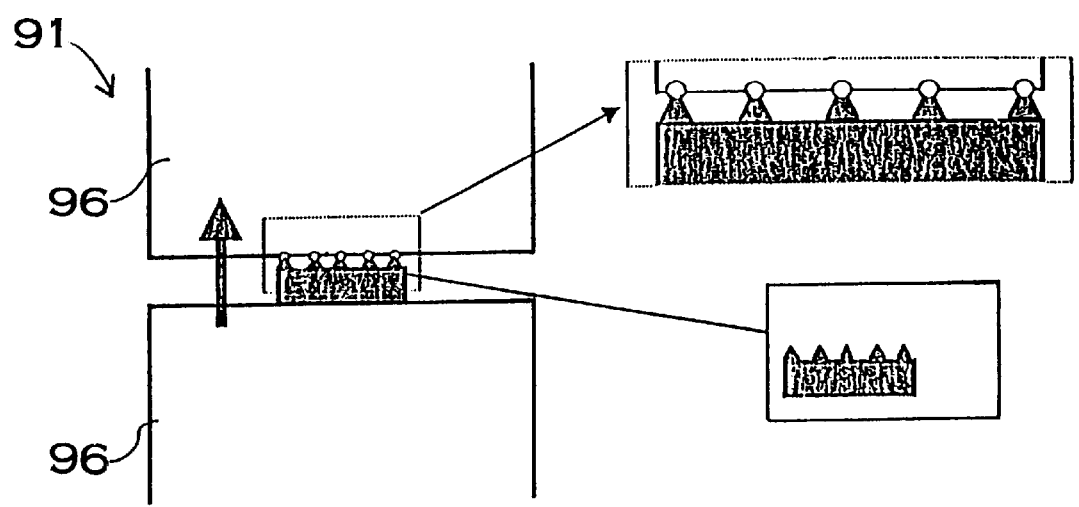
FIG. 9 is a cross-section view showing an example of another power module battery connecting structure.

Still further, as shown in FIG. 9, battery 96 positive and negative terminals of a power module 91 can also be directly welded together with no intervening metal plate between batteries 96. Here, conical projections are provided on the upper surface of a battery sealing plate, which is the positive electrode terminal, and these projections are welded to the negative electrode terminal of an adjacent battery 96 by passage of a high current pulse.

Power modules, as shown in FIGS. 7 through 9, with positive and negative battery terminals directly weld-connected without using dish-shaped connectors, or with metal plates weld-connected to positive and negative battery terminals, drastically reduce electricalresistance between batteries. These power modules also have the characteristic that the connected strength of the batteries can be made robust.

Figure 10:
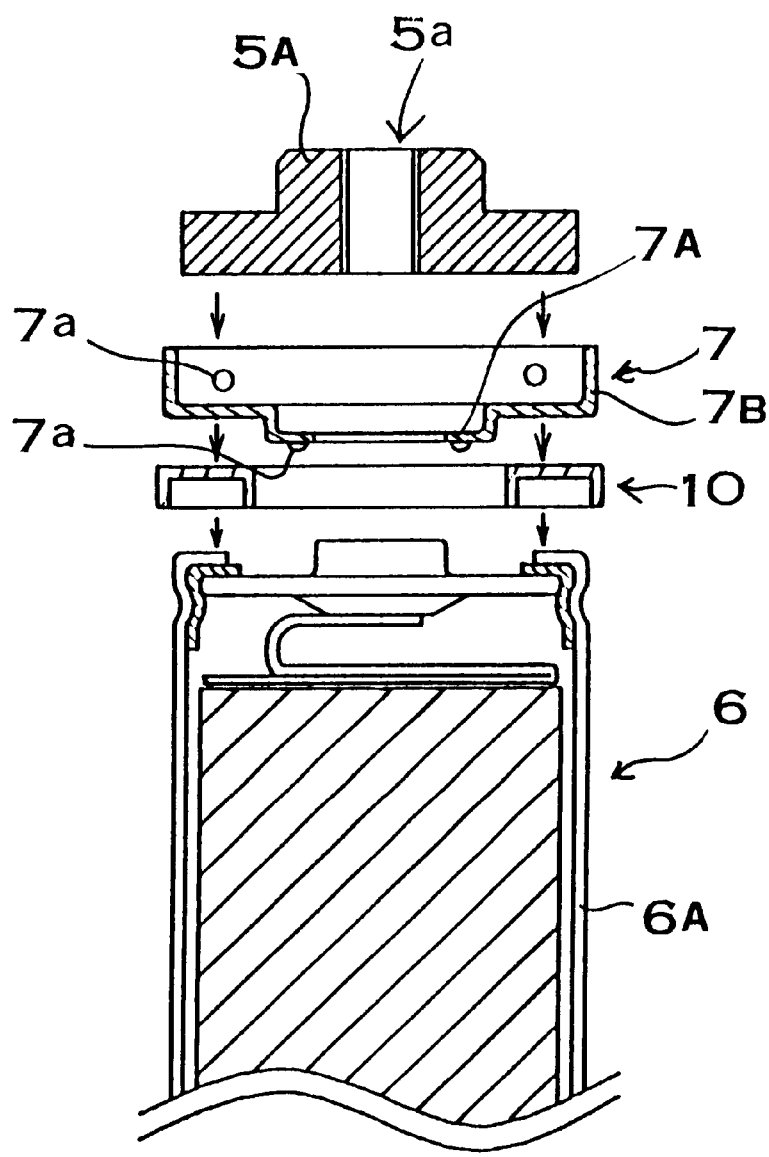
FIG. 10 is an exploded cross-section view showing the positive-side electrode terminal connecting structure for the power module shown in FIG. 5.
Figure 11:
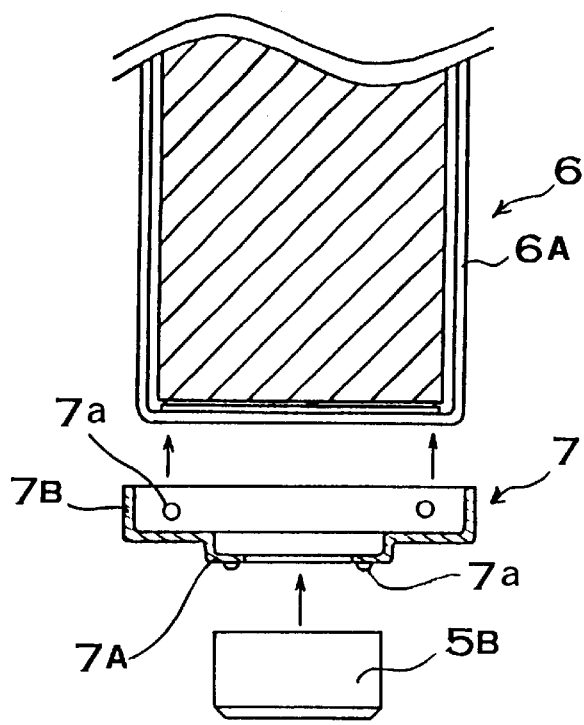
FIG. 11 is an exploded cross-section view showing the negative-side electrode terminal connecting structure for the power module shown in FIG. 5.
Figure 12:
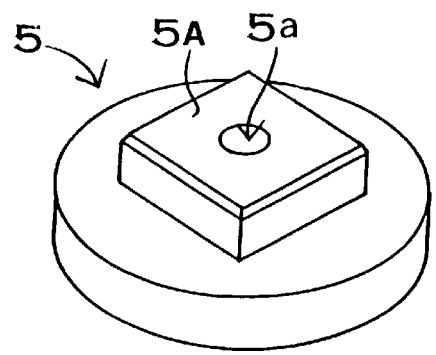
FIG. 12 is an enlarged perspective view of the positive electrode terminal shown in FIG. 10.
Figure 13:
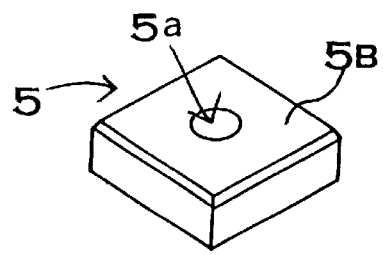
FIG. 13 is an enlarged perspective view of the negative electrode terminal shown in FIG. 11.

As shown in FIGS. 10 and 11, power modules, which are connected in series, have the positive side of the batteries 6 connected to a positive terminal 5A and the negative side connected to a negative terminal 5B. As shown in FIGS. 12 and 13, the central projection of the positive terminal 5A and the negative terminal 5B are formed in the shape of a square pillar. The purpose of the square pillar shape of the central projection of the positive terminal 5A and the negative terminal 5B is for alignment and connection of a plurality of power modules 1 into windows 20 opened in the end-plate 3. Threaded screw holes 5a are provided at the center of electrode terminals 5, namely the positive terminal 5A and the negative terminal 5B.

Rechargeable batteries 6 of the power modules 1 are nickel-hydrogen batteries. However, nickel-cadmium batteries or lithium-ion batteries may also be used as the rechargeable batteries of the power modules.

As shown in FIG. 2, temperature sensors 13 are fixed to the surface of each battery 6 of the power modules 1. The temperature sensors 13 are devices which can measure battery temperature. Preferably, PTC devices which change electrical resistance with battery temperature are used as temperature sensors 13. Temperature sensors 13 fixed to the surface of each battery 6 are connected linearly and in series via sensor leads 14, which extend along, and are fixed lengthwise to the surface of the power modules 1. Temperature sensors 13 and sensor leads 14 are attached to battery 6 surfaces by material such as heat-shrink tubing covering power module surfaces.

Figure 14:
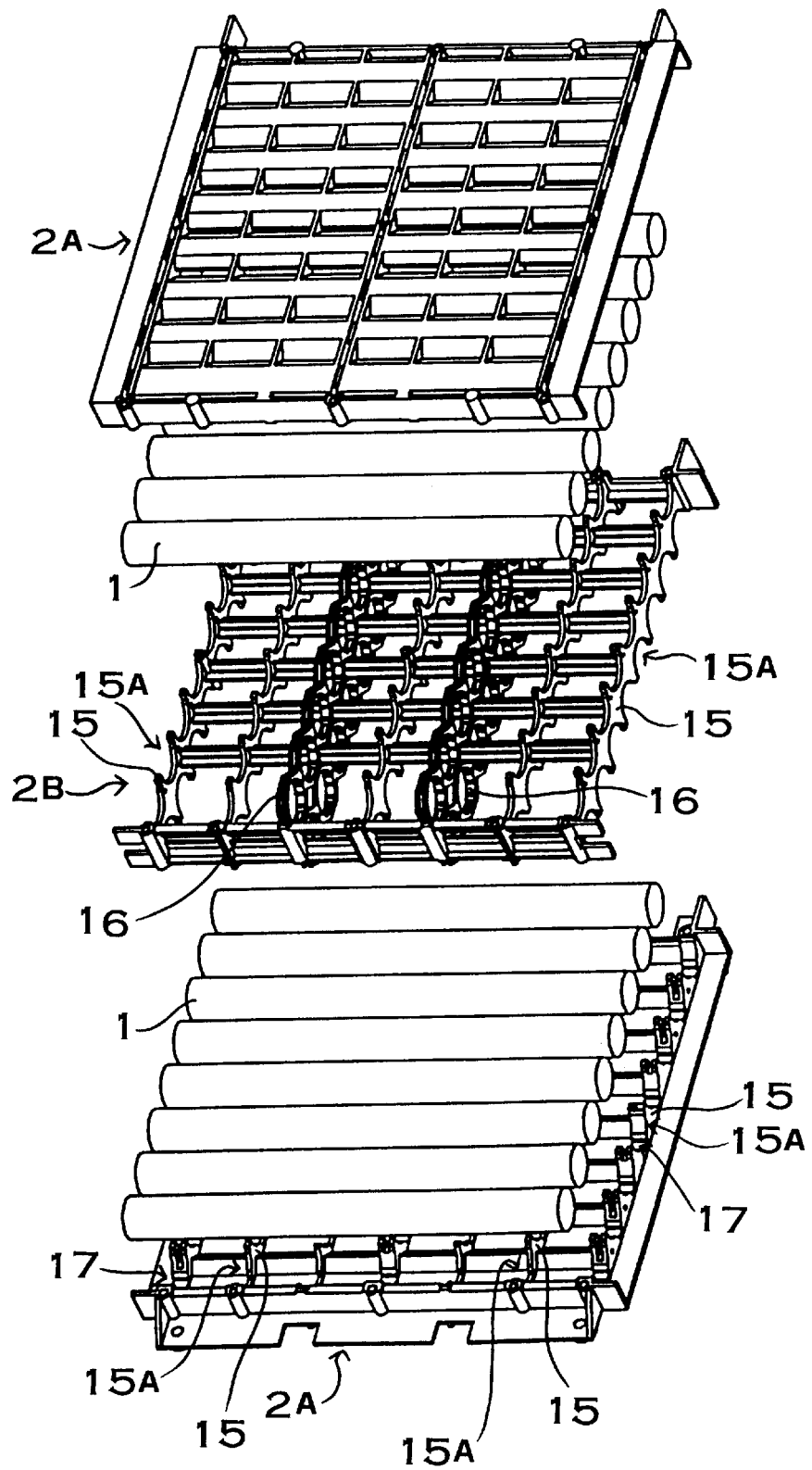
FIG. 14 is an exploded perspective view of the holder-case of the power source shown in FIG. 2.

As shown in an exploded perspective view of FIG. 14, the holder-case 2 is provided with cover-casings 2A and an intermediate-casing 2B disposed between the cover-casings 2A. The cover-casings 2A and intermediate-casing 2B are formed entirely of plastic.

Figure 15:
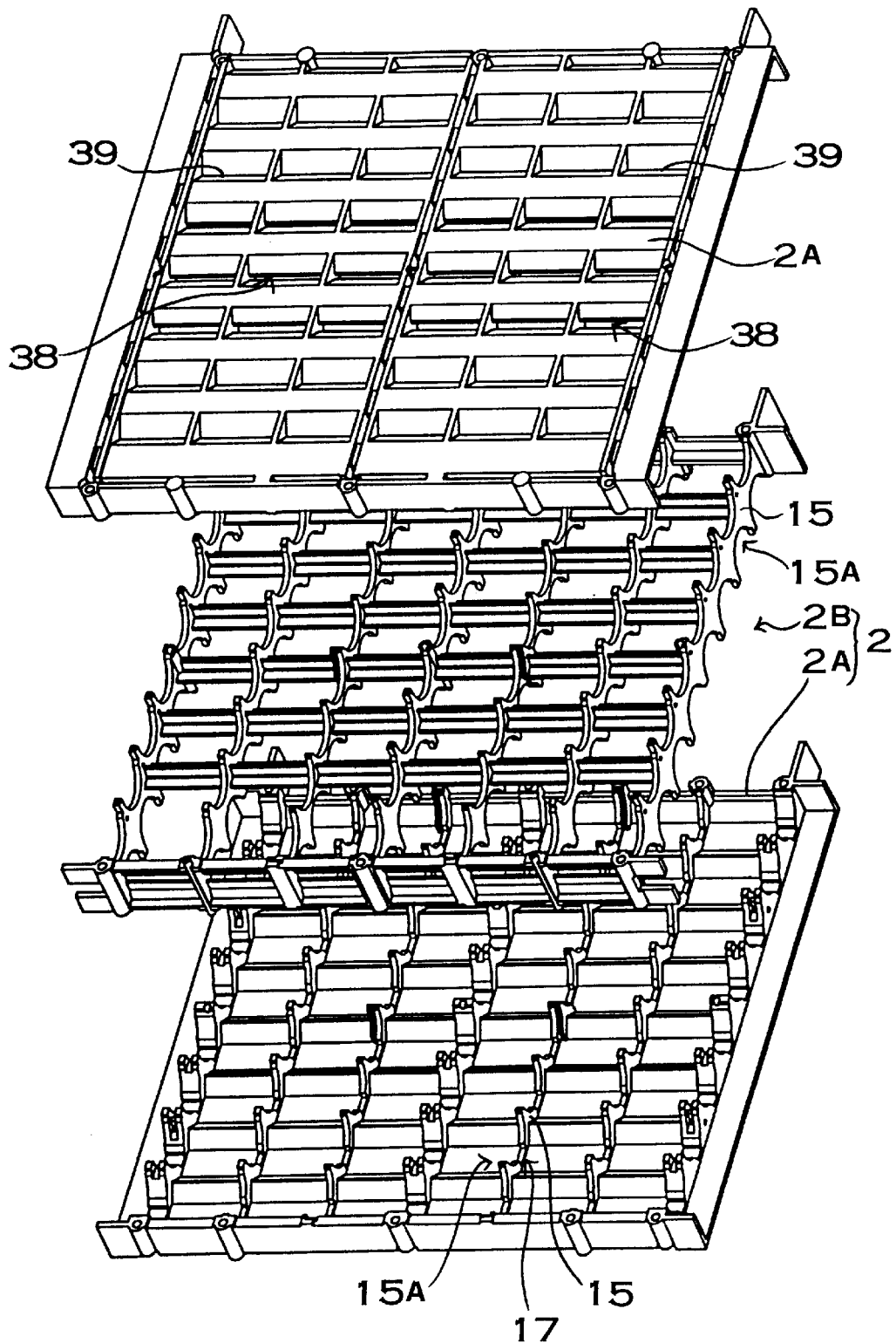
FIG. 15 is an exploded perspective view showing the holder-case shown in FIG. 3.
Figure 16:
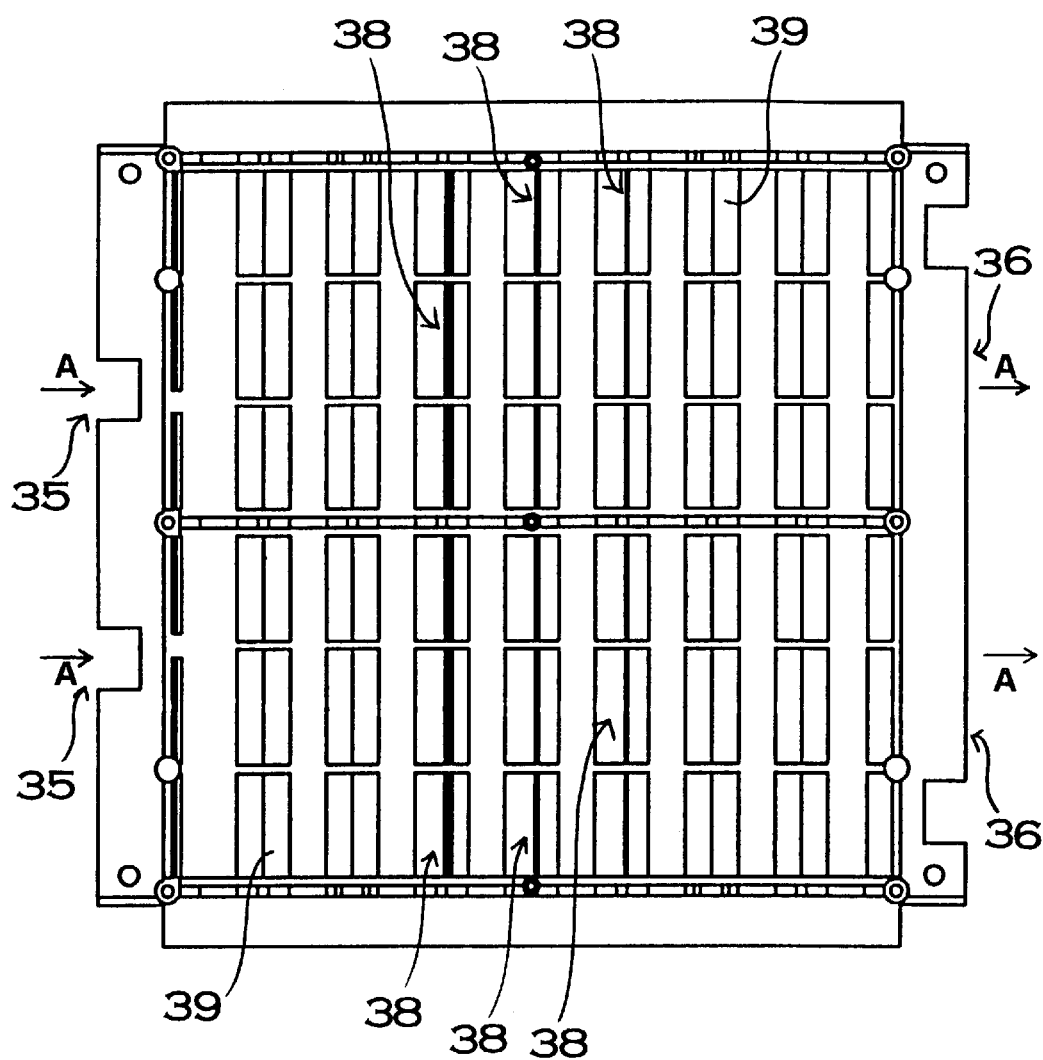
FIG. 16 is a plan view of the power source shown in FIG. 3.
Figure 17:
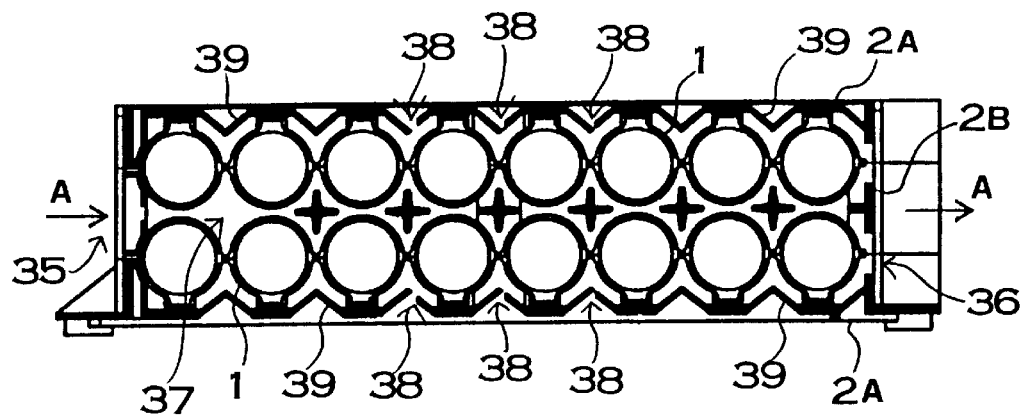
FIG. 17 is a side cross-section view of the power source shown in FIG. 16.
Figure 18:
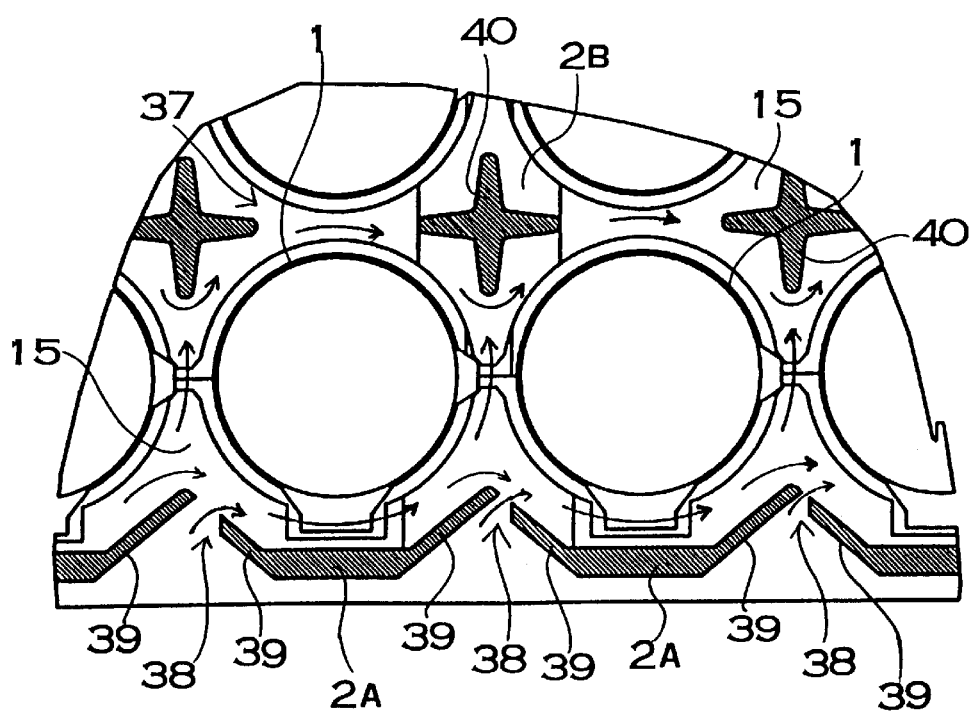
FIG. 18 is an enlarged oblique view of the power source shown in FIG. 17.

Turning to FIGS. 16 through 18, power modules 1 housed in a holder-case 2 shown in FIGS. 3 and 15 are shown. The power modules 1, which are housed in the holder-case 2, are cooled compulsorily by passing air through the holder-case 2 in the direction of arrows A. To pass air through the holder-case 2 in the direction of arrows of A, the holder-case 2 shown in FIG. 16 is provided with an air-inlet 35 at the left end and an air-outlet 36 at the right end. An air-duct 37 is formed between the air-inlet 35 and the air-outlet 36. Power modules 1 housed in the holder-case 2 are compulsorily cooled by passing air through the air-duct 37.

As shown in an cross-section view of FIG. 17, the holder-case 2 is provided with an air-duct 37 which is formed by the top and bottom cover-casings 2A. Power modules 1 are housed in the air-duct 37. Intermediate air-inlets 38 are opened in the cover-casings 2A in a manner allowing air to flow into the middle part of the air-duct 37 to equally cool a plurality of rows of the power modules 1 disposed in the air-duct 37. The intermediate air-inlets 38 are opened through the cover casings 2A in the middle of the air-duct 37, preferably, in a plural fashion. For cooling purposes, the power modules 1 are disposed in the air-duct 37 considerably more equally. Cover-casings 2A shown in FIGS. 15 and 17 are provided with intermediate air-inlets 38 at three places in the middle part. The intermediate air-inlets 38 located near air-inlet 35 are opened larger than the intermediate air-inlets 38 located near air-outlet 36. The holder-case having this shape can cool power modules 1 disposed in air-duct 37 considerably more equally.

As shown in FIGS. 17 and 18, cover-casings 2A are provided with air direction controlling protrusions 39 protruding toward gaps developed between the power modules 1. The air direction controlling protrusions 39 are formed in a cone-shape so as to be inserted into valleys between the power modules 1 and of single-piece construction with the inner surface of the cover-casings 2A. Gaps between the air direction controlling protrusions 39 and the power modules 1 become cooling-air passages. In cover-casings 2A of this structure, the power modules 1 are cooled efficiently by passing air through on the surfaces of power modules 1.

As shown in an enlarged cross-section view of FIG. 18, cover-casings 2A are provided with intermediate air-inlets 38 opened as slits along the end edges of air direction controlling protrusions 39. Further, the intermediate air-inlets 38 are opened on the leeward (downstream) side of the air direction controlling protrusions 39. In cover-casing 2A with this structure, power modules 1 are cooled efficiently by letting cold air, which is supplied from intermediate air-inlets 38, flow along the surfaces of the power modules 1. Further, as shown by arrows of FIG. 18, the direction of the cold air is changed by the air direction controlling protrusions 39, so that the air cools the entire surfaces of power modules 1 branching and flowing along the surfaces of the power modules 1.

An intermediate casing 2B is provided with air direction controlling rods 40, which extend along gaps between power modules 1, to control the flow of air so that the air passes over the surfaces of power modules 1 more equally, and to connect holder ribs retaining power modules 1. The air direction controlling rods 40 shown in FIG. 18 are formed in a cross-shape in the side cross-section view and their protrusions project toward gaps between power modules 1. A cooling-air passage is formed between the air direction controlling rods 40 and power modules 1.

In a holder-case 2 with this structure, if air is sucked from the air-outlets 36 by cooling fans, cooling-air passes through the air-duct 37. Further, cold cooling-air, enters through intermediate air-inlets 38 connected to the middle part of the air duct 37, is mixed with air from an air-inlet 35, and passes through the air-duct 37 to cool power modules 1.

Figure 19:
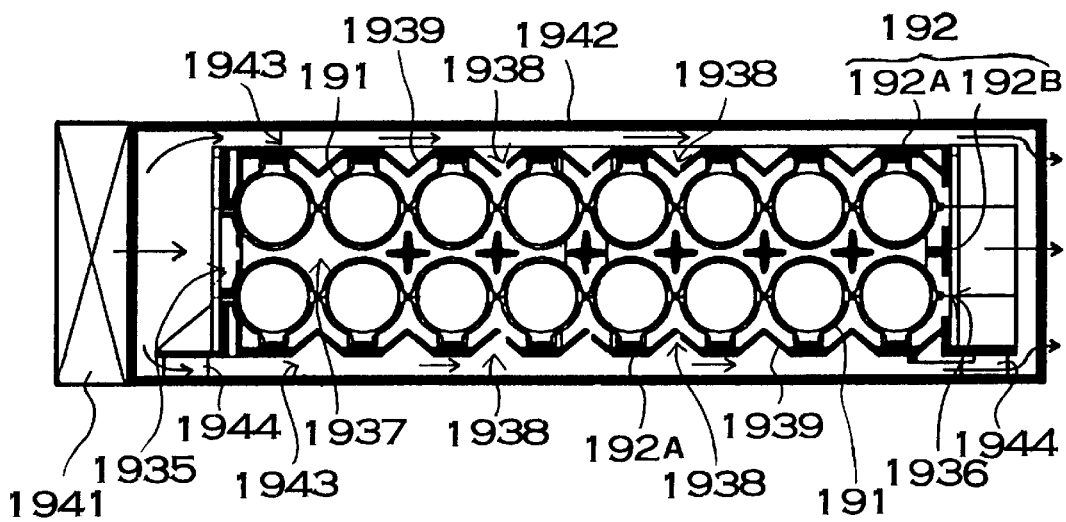
FIG. 19 is a side cross-section view of another embodiment of the power source of the present invention.
Figure 20:
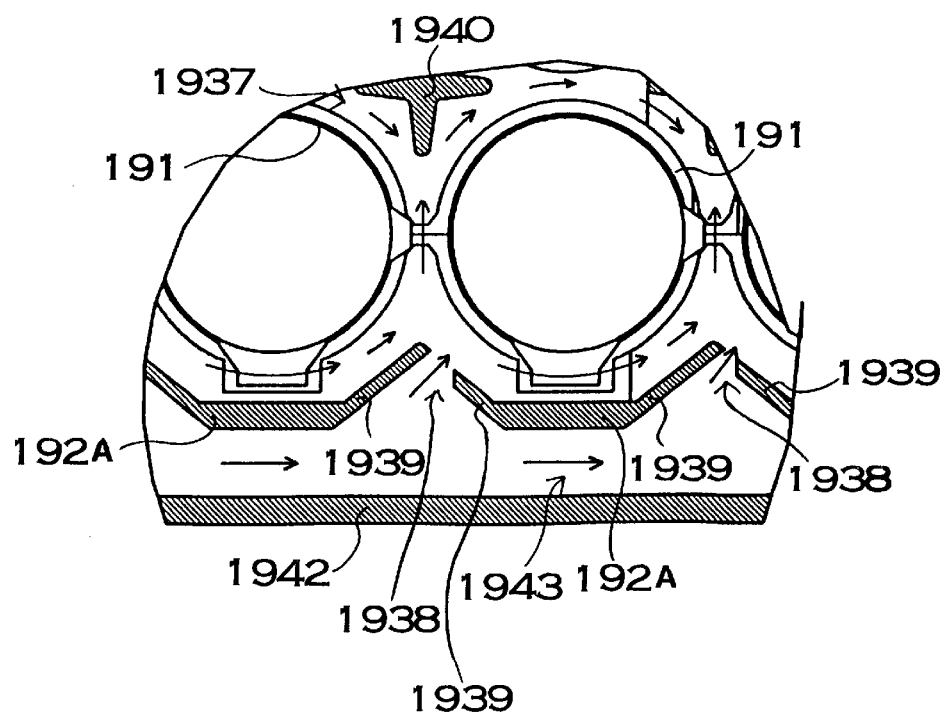
FIG. 20 is an enlarged perspective view of the power source shown in FIG. 19.

A holder-case 2 having this structure is provided with air-outlets 36 connected to a suction side of cooling fans. However, in a power source of the present invention, air-outlets 36 are not necessarily connected with cooling fans. For example, air current generated by driving automobiles can pass through the holder-case 2 and cool power modules 1. Further, a power source shown in FIG. 19 is provided with a main air-inlet 1935 connected to a cooling fan 1941. In this power source, a holder-case 192 is housed in a power source box 1942 and outer air-ducts 1943 for passing cooling-air therethrough are formed between the power source box 1942 and the holder-case 192. As shown in an enlarged cross-section view of FIG. 20, intermediate air-inlets 1938 provided in the holder-case 192 are opened to outer air-ducts 1943 and cooling-air in the outer air-ducts 1943 flows into an air-duct. 1937

Figure 21:
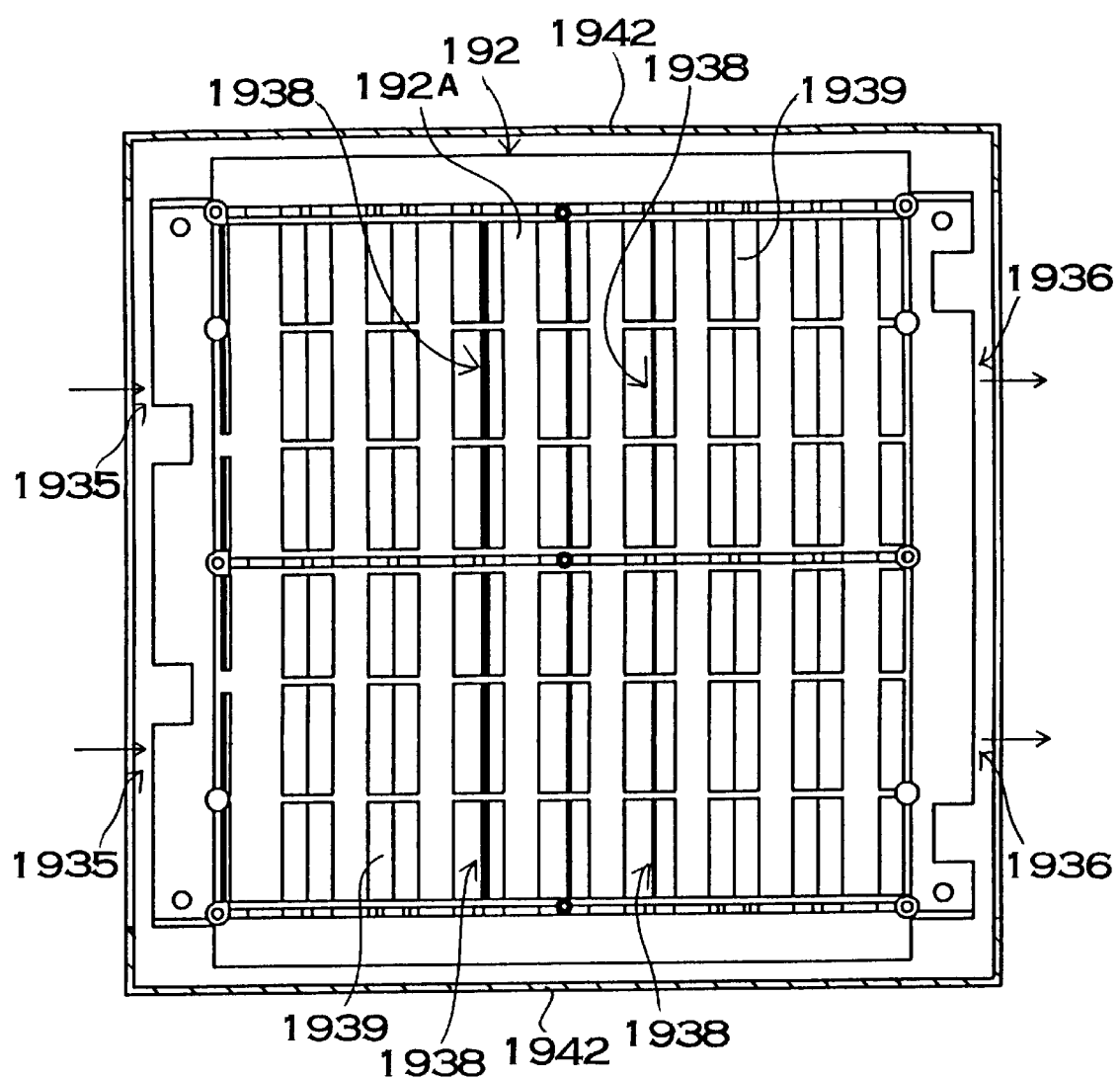
FIG. 21 is a horizontal cross-section view of the power source shown in FIG. 19.

As shown in cross-section views of FIGS. 19 and 21, a power source box 1942 is formed of plastic in a box-shape to a size which allows an outer air-duct 1943 to be formed between the power source box 1942 and the holder-case 192. The power source box 1942 has a connection part opened for connecting with a cooling fan 1941 and an exhaust part opened for exhausting air discharged from an air-outlet 1936 of the holder-case 192. The remaining parts are closed. A holder-case 192 shown in FIG. 19 is provided with legs 1944 for connecting with the power source box 1942. These legs 1942 are screw-fastened on the inside surface of the power source box 1942 to form outer air-duct 1943 between the holder-case 192 and the power source box 1942. In a power source with this structure, power modules 191 are cooled effectively by tightly connecting and fixing the surface of power source box 1942 to automobiles. This is because the outer air-ducts 1943 are provided between the power source box 1942 and the holder-case 192, and cooling-air is passed through the outer air-ducts 1943. Further, in these figures, reference number 192A shows a cover-casing, 192B shows an intermediate cover-casing, 1939 shows an air direction controlling protrusion, and 1940 shows an air direction controlling rod.

Figure 22:
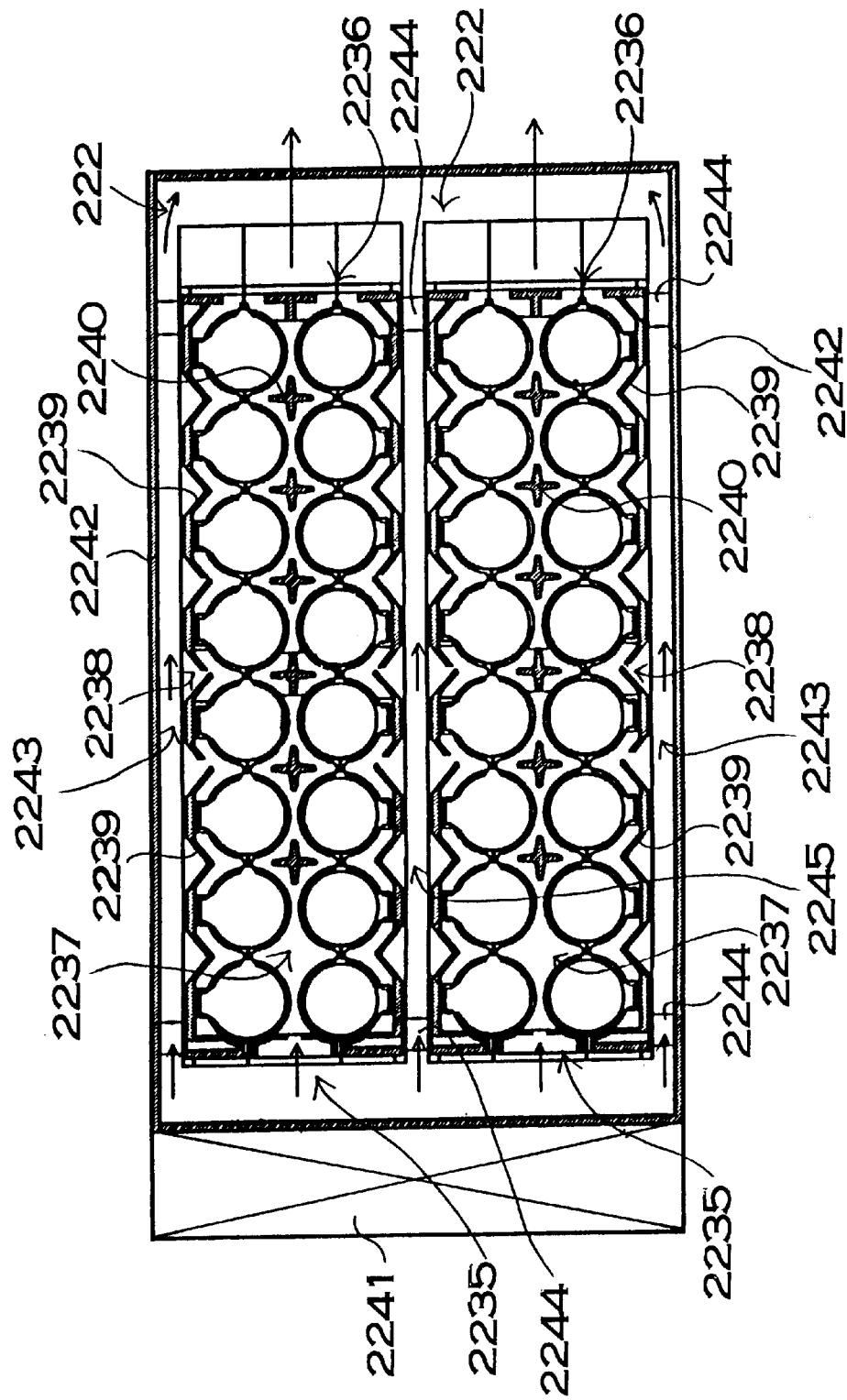
FIG. 22 is a side cross-section view of another embodiment of the power source of the present invention.
Figure 23:
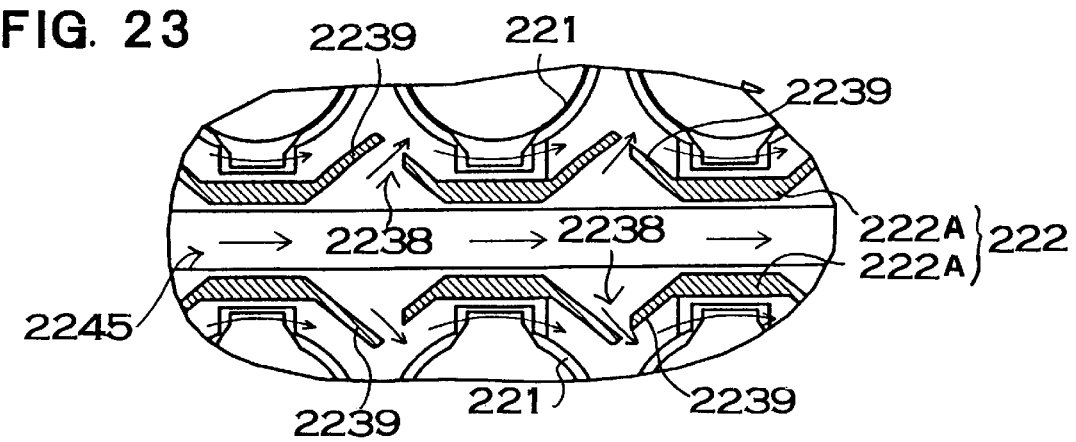
FIG. 23 is an enlarged perspective view of the power source shown in FIG. 22.

In addition, a power source shown in FIG. 22 is provided with a plurality of holder-cases 222 layered vertically and an intermediate air-duct 2245 disposed between adjacent holder-cases 222 for passing cold air therethrough. The power source in FIG. 22 is comprised of layering two levels of holder-cases 222 vertically in a manner allowing an intermediate air-duct 2245 to be formed, housing the layered holder-cases 222 in a power source box 2242 and fixing them to the power source box 2242. As shown in an enlarged cross-section view of FIG. 23, intermediate air-inlets 2238 of holder-case 222 are opened to an intermediate air-duct 2245, and thereby cold cooling-air passing through the intermediate air-duct 2245 flows into the air-duct 2237.

Figure 24:
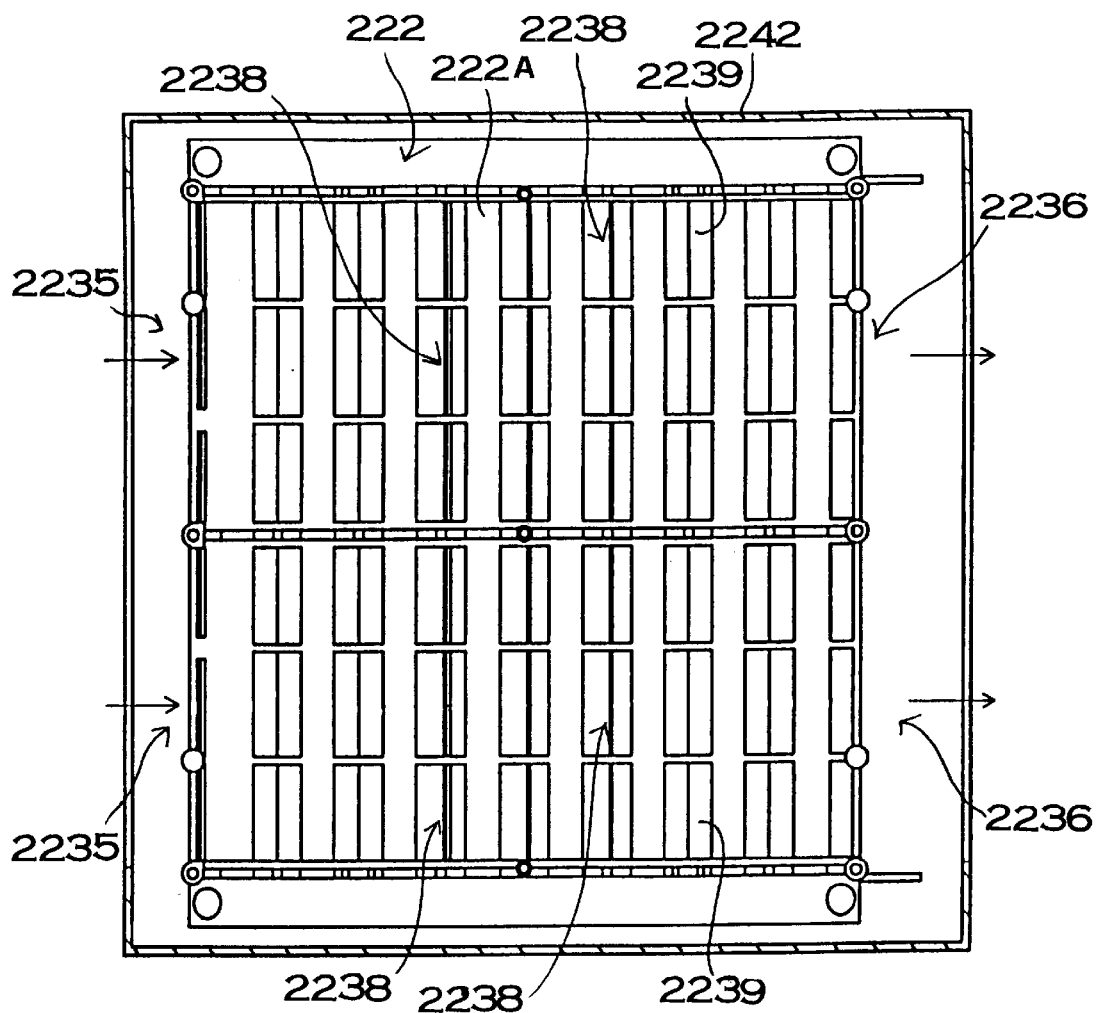
FIG. 24 is a horizontal cross-section view of the power source shown in FIG. 22.

In addition, the holder-case 222 is fixed in the power source box 2242 so that air which passes through the outer air-duct 2243 can flow into the air-duct 2237 through the intermediate air-inlets 2238. As shown in FIGS. 22 and 24, a power source box 2242 is formed of plastic in a box-shape to a size which allows the outer air-duct 2243 to be formed between the power source box 2242 and the holder-case 222. The power source box 2242 is provided with a connection part opened for connecting with a cooling fan 2241 and an exhaust part opened for exhausting air discharged from an air-outlet 2236 of the holder-case 222. The remaining parts are closed. A holder-case 222 is connected with an adjacent holder-case 222 and further provided with legs 2244 for connecting with the power source box 2242. These legs 2242 are screw-fastened to the power source box 2242 to form an intermediate air-duct 2245 between the holder-cases 222 and an outer air-duct 2243 between the holder-case 222 and the power source box 2242. In a power source with this structure, power modules 221 are cooled effectively by tightly connecting and fixing the surface of power source box 2242 to automobiles and also can house many power modules in a small area since the holder-cases 222 can be layered in a vertical fashion. Further, in these figures, reference number 222A shows a cover-casing, 222B shows an intermediate cover-casing, 2235 shows a main air-inlet, 2239 shows an air direction controlling protrusion, and 2240 shows an air direction controlling rod.

Holder ribs 15 are formed as a single piece with the cover-casings 2A and the intermediate-casing 2B for the purpose of sandwiching and retaining power modules 1 in fixed positions. The cover-casings 2A and intermediate-casing 2B shown in FIG. 14 are provided with a plurality of parallel rows of holder ribs 15 at both ends and at intermediate positions. Holder ribs 15 are provided on the inside of cover-casings 2A and on both sides of intermediate-casing 2B. Holder-ribs 15 retain power modules 1 in fixed positions, divides an air-duct 37 into plural sections, allows air to pass through each divided air-duct 37, and enables power modules 1 to be cooled.

Figure 25:
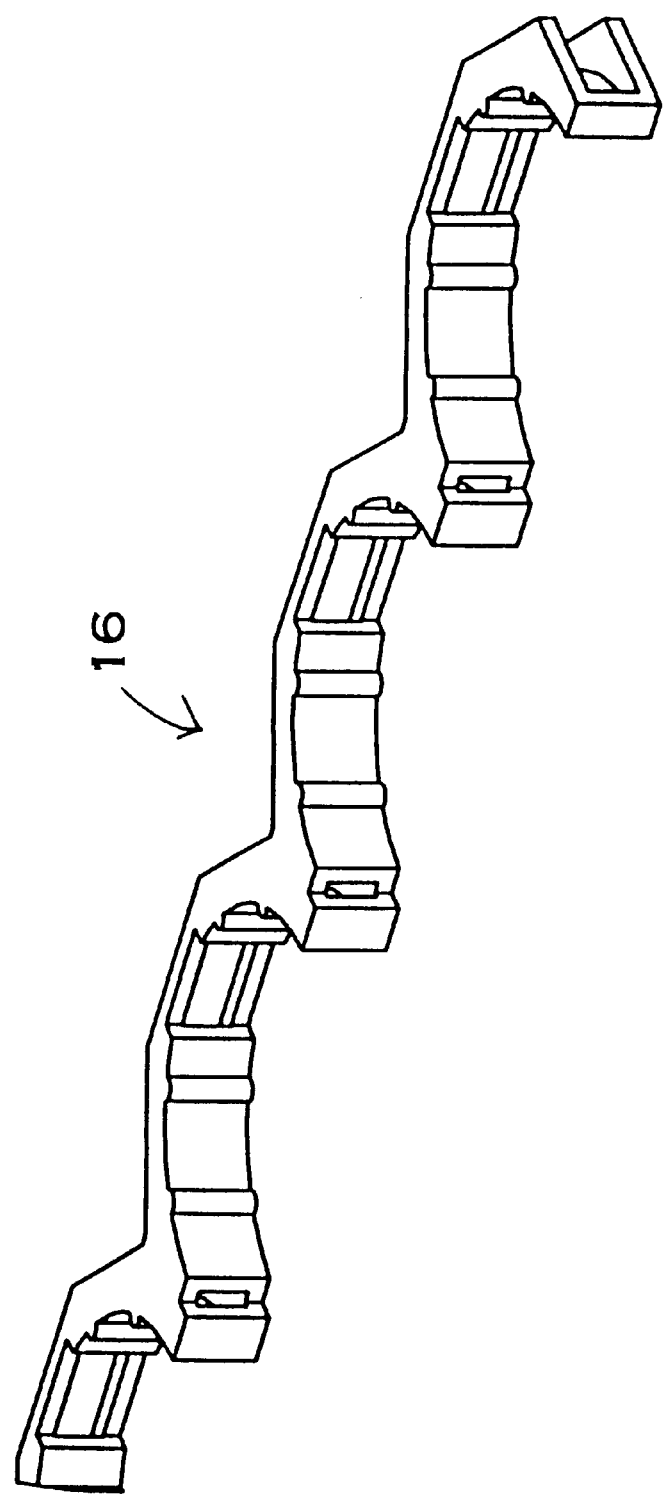
FIG. 25 is an enlarged perspective view showing shock-absorbing gaskets connected to the holder-rib of the holder-case shown in FIG. 14.

Holder ribs 15 are provided with retaining cavities 15A curved in half-circular shapes which follow power module 1 outlines to retain the circular cylindrical power modules in fixed positions. Cylindrical power modules 1 fit into the retaining cavities 15A, and are sandwiched and held in fixed positions. Flexible rubber shock-absorbing gaskets 16 are attached along retaining cavities 15A to improve battery 6 shock-resistance. The holder-case 2 of FIG. 14 has shock-absorbing gaskets 16 attached to 2 rows of intermediate holder ribs 15. As shown in FIG. 25, shock-absorbing gaskets 16 are formed in shapes which conform to the holder ribs 15. FIG. 14 shows shock-absorbing gaskets 16 in which shock-absorbing gaskets 16 shown in FIG. 25 are connected together with their cut outs opposing. Shock-absorbing gaskets 16 retain power modules 1 tightly by sandwiching them between their cut outs opposing each other. A holder-case in which shock-absorbing gaskets 16 are connected with holder ribs 15 can absorb shock so as to prevent power modules 1 from vibrating.

Holder ribs 15 are provided with guiding cut-outs 17 at the bottoms of the retaining cavities 15A for guiding temperature sensors 13 and sensor leads 14, which jut out from the surface of the power modules 1. Temperature sensors 13 and sensor leads 14 are inserted into the guiding cut-outs 17 and power modules 1 are sandwiched in fixed positions via holder rib 15 retaining cavities 15A.

A holder-case 2 with the above structure is assembled as follows to retain power modules 1 disposed in parallel. The bottom cover-casing 2A is first set horizontally and power modules 1 are lined up in a parallel fashion by insertion into holder rib 15 retaining cavities 15A. In the cover-casing 2A of the figures, 8 rows of power modules 1 are arranged in the holder ribs 15. Power modules 1 are lined up to arrange both ends in single planes. At this point, temperature sensors 13 and sensor leads 14 projecting from power module 1 surfaces are guided through holder rib 15 guiding cut-outs 17.

The intermediate-casing 2B is then placed on the bottom cover-casing 2A. The power modules 1 are inserted into the retaining cavities 15A of holder ribs 15 projecting from the bottom surface of the intermediate-casing 2B to align the layer.

Power modules 1 are then lined up in a parallel fashion by insertion into retaining cavities 15A in the holder ribs 15 projecting from the upper surface of the intermediate-casing 2B. Again, power modules 1 are lined up to arrange both ends in single planes.

The top cover-casing 2A is placed over the power modules 1 so as to align the top layer cover-casing 2A. In this configuration, power modules 1 are guided into the retaining cavities 15A of holder ribs 15 projecting from the bottom side of the cover-casing 2A.

Finally, the top and bottom cover-casings 2A are joined with connecting screws (not illustrated) to connect and hold the top and bottom cover-casings 2A and intermediate-casing 2B together. Connecting screws pass through the top and bottom cover-casings 2A and intermediate-casing 2B to join them. Connecting screws join the top and bottom cover-casings 2A at the four corner regions and at intermediate locations.

Figure 26:
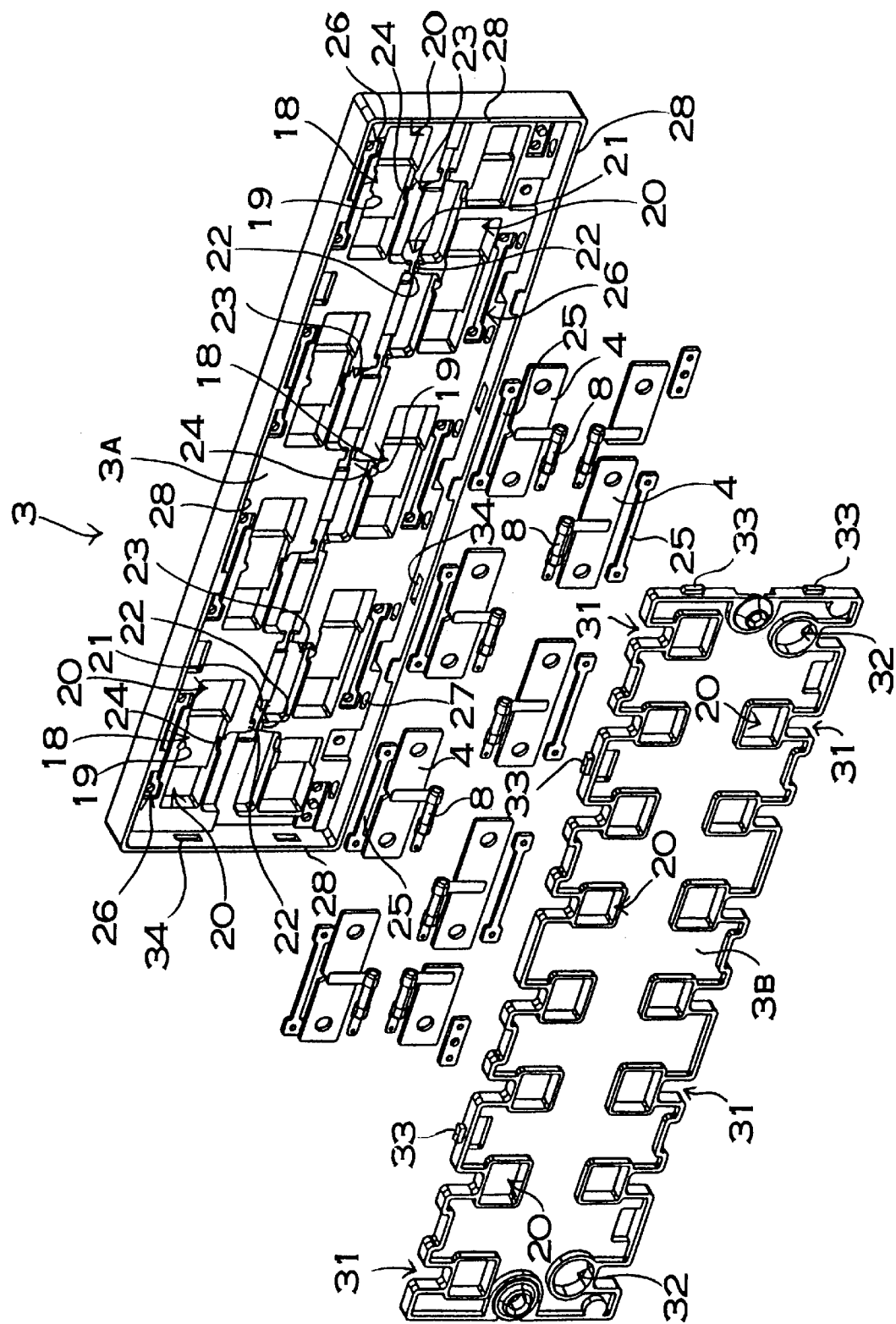
FIG. 26 is an exploded perspective view showing the end-plate of the power source shown in FIG. 2.
Figure 27:
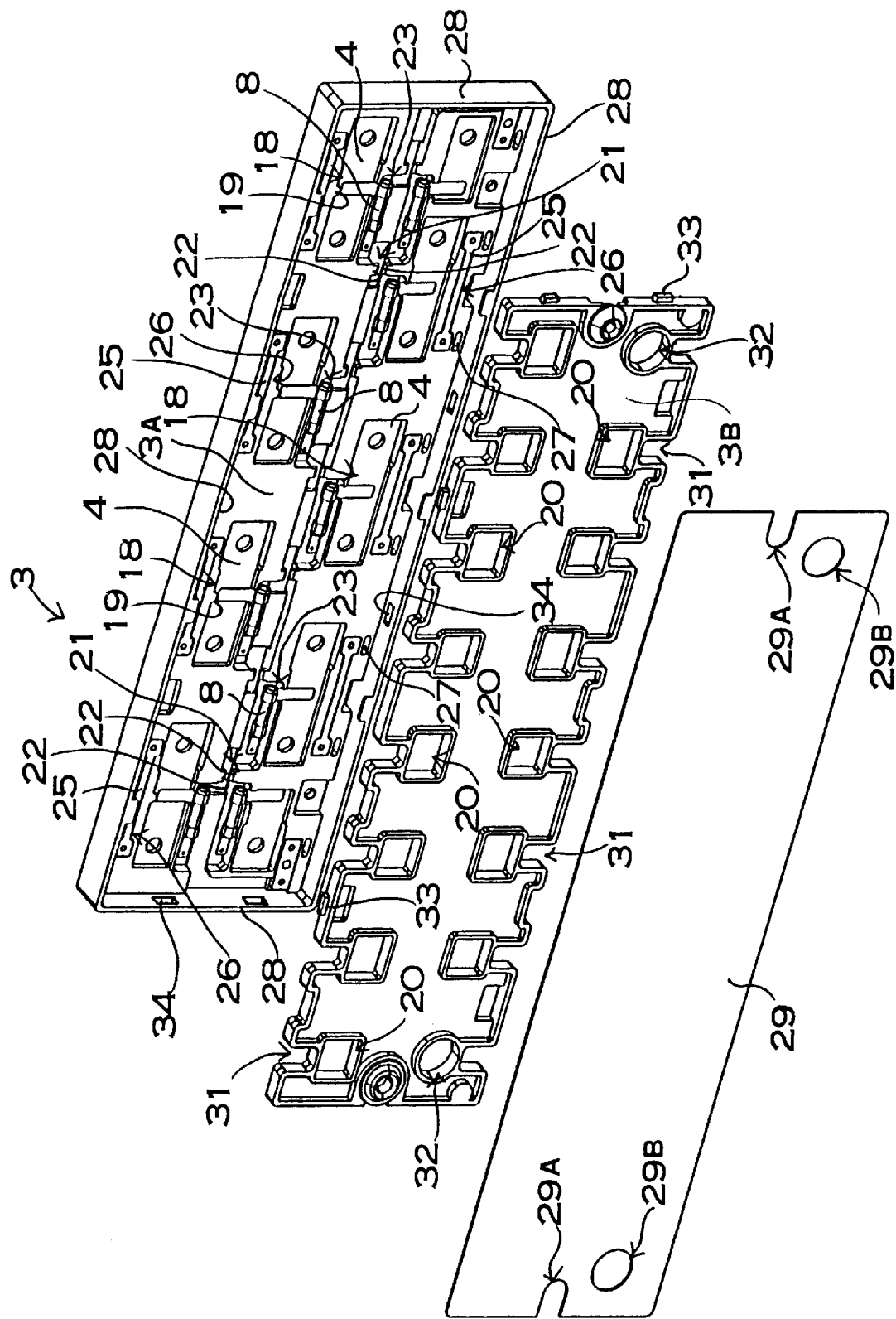
FIG. 27 is an exploded perspective view showing assembly of the end-plate shown in FIG. 26.

End-plates 3 are fixed to the holder-case 2 retaining power modules 1 in fixed positions in the configuration described above. The end-plates 3 house pass bars 4 which connect the power modules 1 of the holder-case 2 in series. An end-plate 3 holds pass bars 4 in fixed positions, and, as shown in the exploded perspective views of FIGS. 26 and 27, is provided with a frame section 3A and a cover section 3B which layer together for connection. The frame section 3A and a cover section 3B of an end-plate 3 are formed separately, both of single-piece plastic construction. The frame section 3A is disposed on the side facing the power modules 1, and the cover section 3B is disposed on the backside of the frame section 3A.

The frame section 3A has pass bars 4 disposed on its backside, which connect the power modules 1 in series. Pass bars 4 disposed here are sandwiched between the frame section 3A and a cover section 3B for retention in fixed positions on an end-plate 3.

Figure 28:
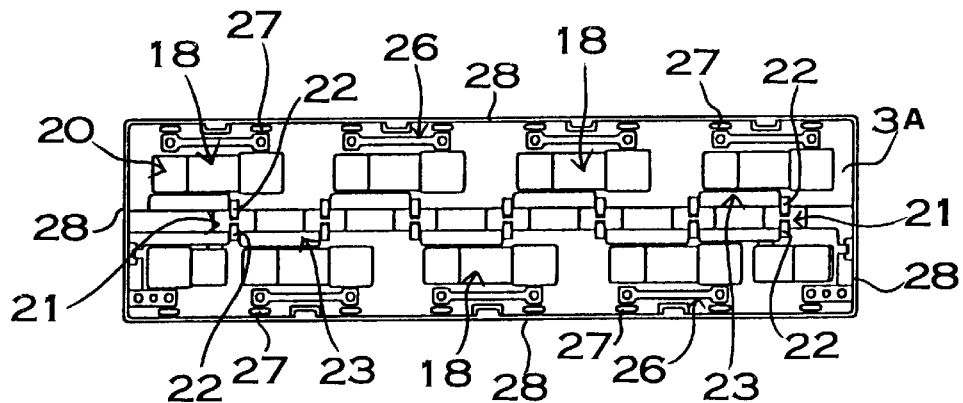
FIG. 28 is a plan view showing assembly of the frame of the end-plate shown in FIG. 26.
Figure 29:
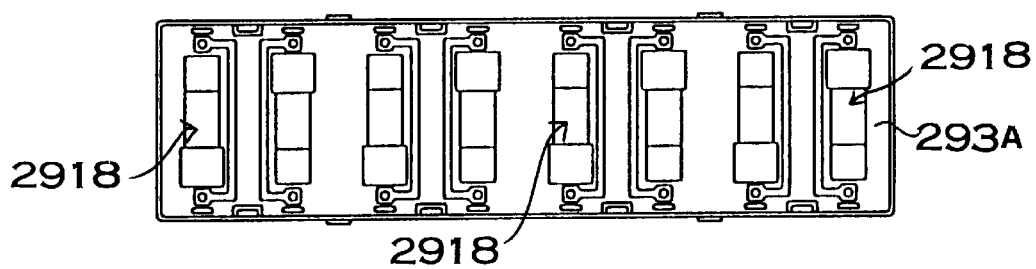
FIG. 29 is a plan view showing another example of an end-plate frame.
Figure 30:
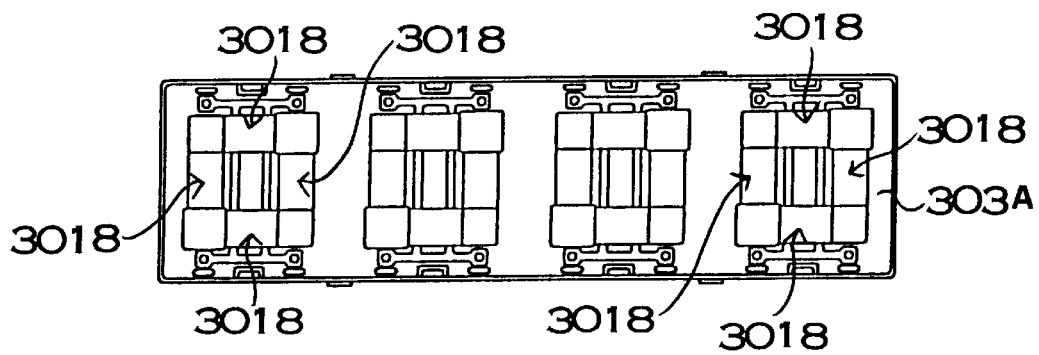
FIG. 30 is a plan view showing another example of an end-plate frame.

The frame section 3A shown in the figures has pass bar insertion cavities 18 formed on its backside to hold pass bars 4 in fixed positions. A pass bar insertion cavity 18 is approximately the same size as a rectangular pass bar 4 outline to allow insertion of a metal plate pass bar 4, but more precisely, the insertion cavity 18 is a slightly larger rectangle. The frame sections 3A shown in the perspective views of FIGS. 26 and 27 and in FIG. 28 are provided with pass bar insertion cavities 18 which extend in the lateral direction. In this patent application, pass bar 4 lateral direction is taken to be the lengthwise direction of the pass bar 4, and the direction perpendicular to this is taken to be the vertical direction. The frame section 293A shown in FIG. 29 is provided with pass bar insertion cavities 2918 which extend in the vertical direction. The frame section 303A shown in FIG. 30 is provided with pass bar insertion cavities 3018 in both the vertical and lateral directions. Pass bars are inserted into the pass bar insertion cavities 2918 and 3018 to connect power modules in series.

Figure 31:
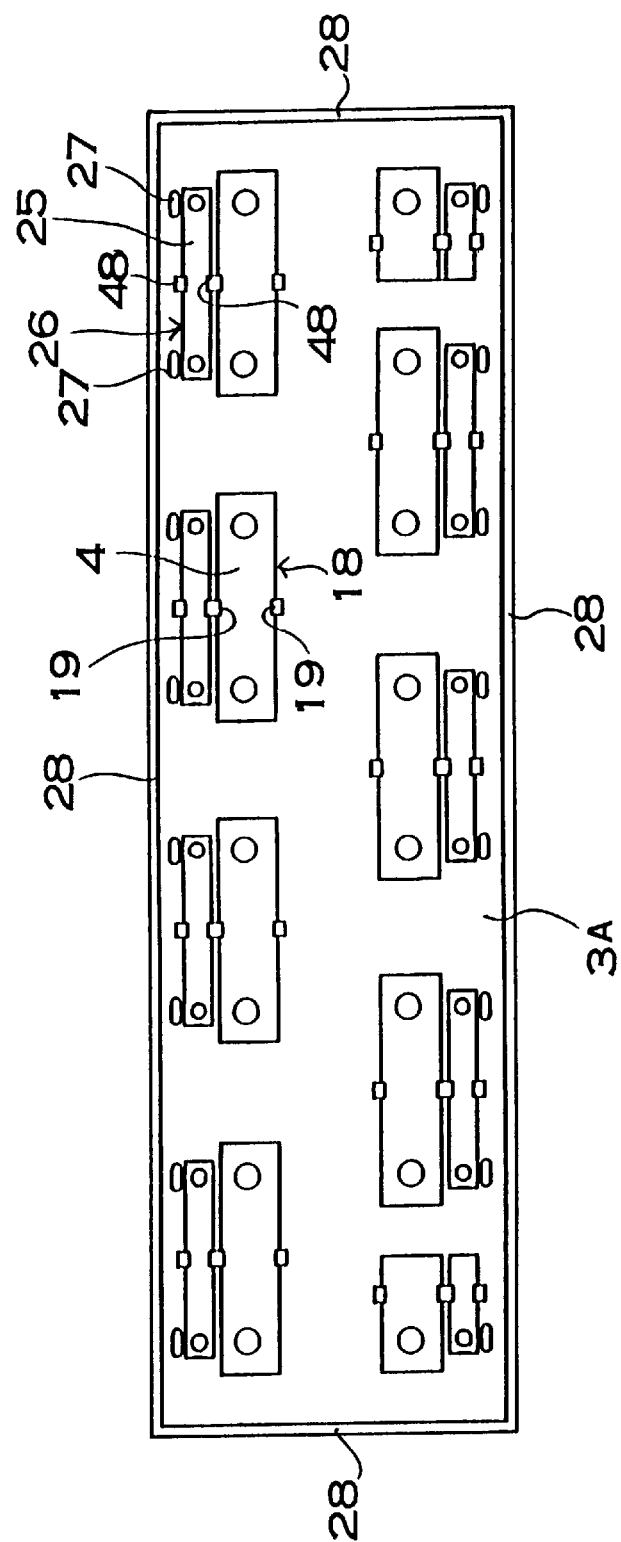
FIG. 31 is a plan view showing pass bars attached to the frame of the end-plate.
Figure 32:
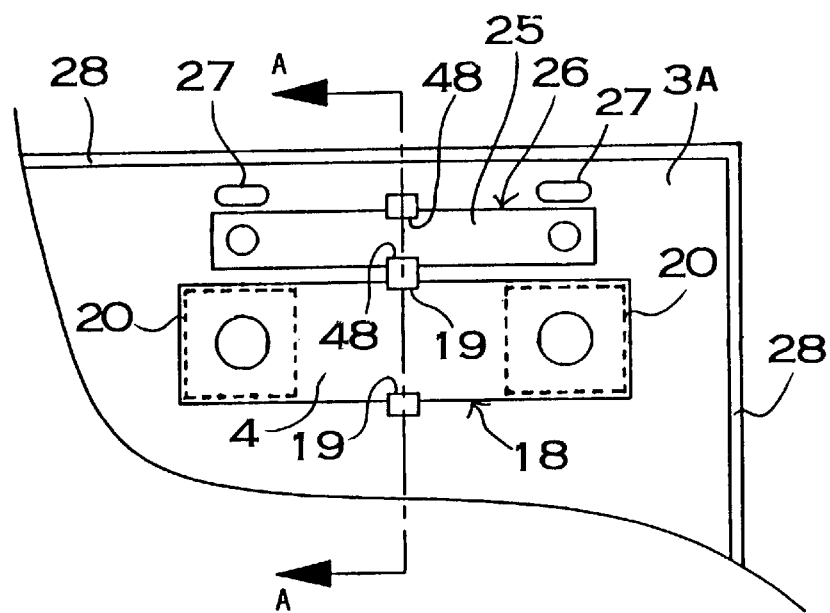
FIG. 32 is an enlarged view showing the frame shown in FIG. 31.
Figure 33:
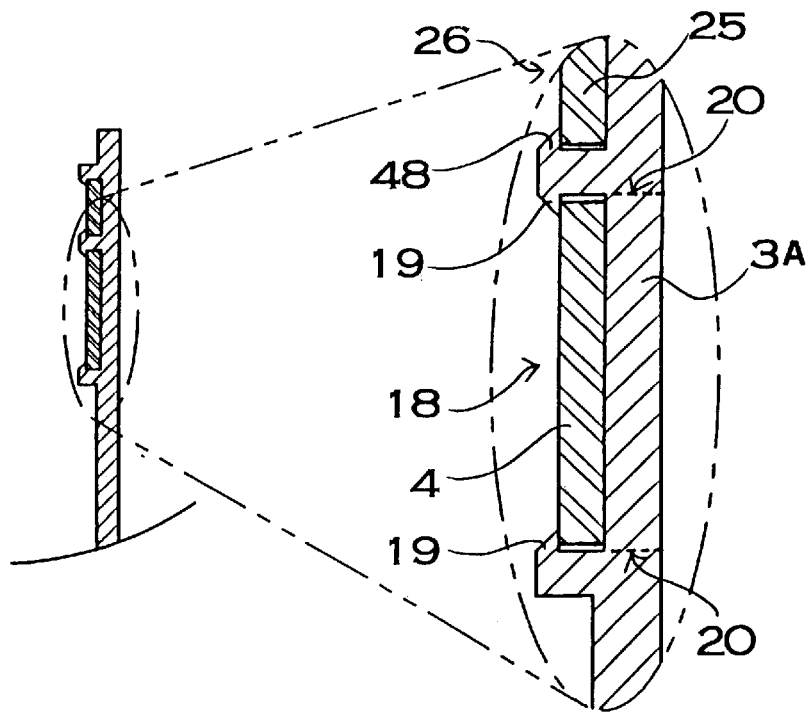
FIG. 33 is a line A—A cross-section view showing the frame shown in FIG. 32.

As shown in FIG. 31, stopper clasps 19 are provided at pass bar insertion cavity 18 openings to prevent pass bars 4 from falling out of the cavities, and are formed of single-piece construction with a frame section 3A made of plastic. As shown in an enlarged oblique view of FIG. 32 and a cross-section view of FIG. 33, stopper clasps 19 project from the inside surface of pass bar insertion cavity 18 openings. Stopper clasps 19 shown in the figures project from the inside surface, approximately at the middle of each long side of the pass bar insertion cavity 18 openings. Windows 20 are provided at both ends of pass bar insertion cavities 18 for connecting pass bars 4 with electrode terminals of the power modules 1. The pass bar insertion cavities 18 are provided with stopper clasps 19 in the middle of the windows 20 at both ends.

Figure 34:
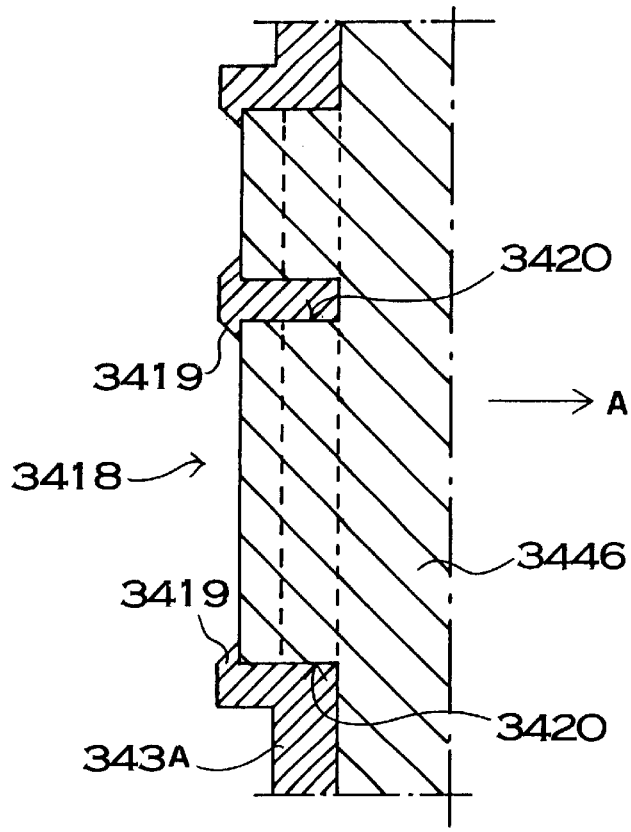
FIG. 34 is a cross-section view showing the molded frame of another embodiment.

Stopper clasps may also be provided in the part of the windows disposed at both ends of pass bar insertion cavities. A frame sections with this structure have the characteristic that the stopper clasps can be formed by a simple mold. This is because, as shown in a cross-section view of FIG. 34, the inside surface of projection of stopper clasps 3419 can be molded by a mold 3446 for molding windows 3420 disposed at both ends of pass bar insertion cavities 3418. As shown in this figure, a mold 3446, which molds the inside surface of the projection of stopper clasps 3419, can make a molded frame section 343A ejected from the mold 3446 by moving in the direction of an arrow A.

If stopper clasp 19 projection height is too tall, it is difficult for pass bars 4 to fall out of pass bar insertion cavities 18, but pass bar 4 insertion into pass bar insertion cavities 18 also becomes difficult. Conversely, if stopper clasps 19 are short, pass bars 4 are easy to insert into pass bar insertion cavities 18, but pass bars 4 also easily fall out of pass bar insertion cavities 18. Height of stopper clasp 19 projection is designed to allow smooth pass bar 4 insertion into pass bar insertion cavities 18 and effectively prevent pass bars 4 from falling out of pass bar insertion cavities 18.

Figure 35:
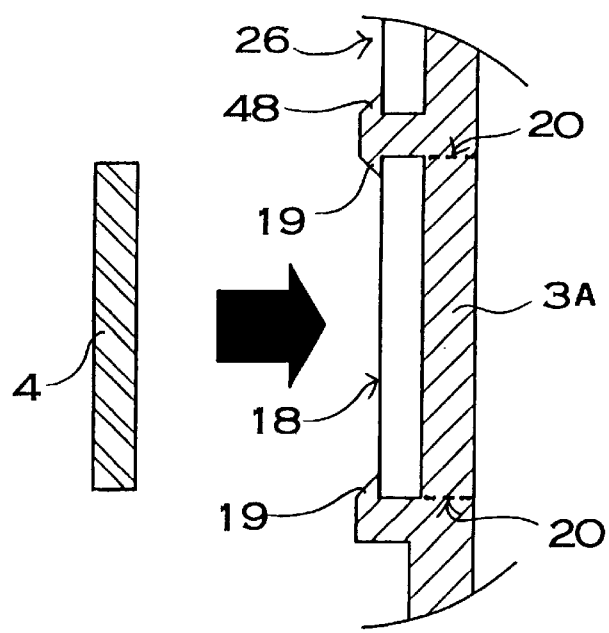
FIG. 35 is a cross-section view showing the pass bar attached to the frame shown in FIG. 33.

End-plates 3 having this structure hold pass bars 4 in fixed positions in pass bar insertion cavities 18 as shown in FIG. 35. When pass bars 4 are inserted into the pass bar insertion cavities 18, stopper clasps 19 slightly deforms elastically to allow the pass bars 4 to pass through. For example, the pass bars 4 inserted into the pass bar insertion cavities 18 can not fall out of the pass bar insertion cavities 18 even if frame section 3A is placed in such a posture that windows 20 are the upper face. When compulsorily taking pass-bars 4 out of the pass bar insertion cavities 18, stopper clasps 19 again slightly deform elastically to allow pass bars 4 to pass through.

Figure 36:
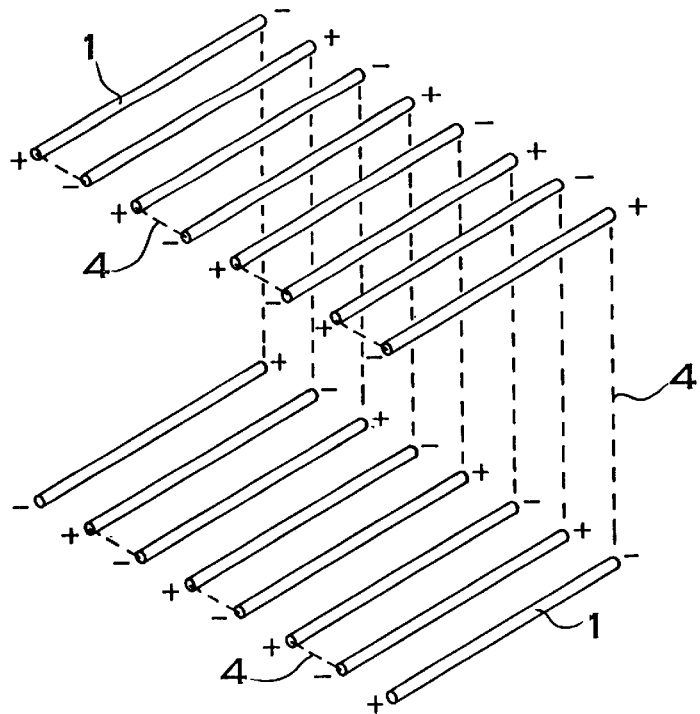
FIG. 36 is an diagrammatic perspective view showing a plurality of power modules connected in series by pass bars.

The holder-case 2 shown in FIG. 2 has two vertical levels vertically and houses 8 power module 1 rows. In this holder-case 2, the end-plate 3 at one end connects power modules 1 in series by housing pass bars 4 laterally, and the end-plate 3 at the other end connects power modules 1 in series by housing pass bars 4 vertically. This connects all power modules 1 in series as shown in an diagrammatic perspective view of FIG. 36. Consequently, the end-plate 3 attached-to one end of the holder-case 2 houses pass bars 4 oriented in the lateral direction as shown in FIGS. 26, 27, and 28, and the end-plate 3 attached to the other end of the holder-case 2 houses pass bars 4 oriented in the vertical direction as shown in FIG. 29. As shown in FIG. 30, a frame section 303A provided with pass bar insertion cavities 3018 in both vertical and lateral directions can be attached to both ends of a holder-case 2.

Frame sections 3A are provided with windows 20 at both ends of pass bar insertion cavities 18 for connecting pass bars 4 with power module 1 electrode terminals 5. The windows 20 are formed in a shape allowing power module 1 electrode terminals 5 fixed to battery 6 electrodes to fit in the windows without rotation. The power modules 1 shown in the figures have square electrode terminals 5 fixed to both ends. Windows 20 to fit these electrode terminals 5 are approximately the same size as the outline of the electrode terminals 5, but more precisely are formed with inside shapes slightly larger than the electrode terminals 5. In this type of frame section 3A, power module 1 electrode terminals 5 insert into windows 20 to retain the power modules 1 without rotation and allow pass bar 4 connection.

Frame sections 3A shown in FIG. 26 are provided with lead wire grooves 21 to hold lead wires in fixed positions. Lead wire grooves 21 are provided parallel to pass bar insertion cavities 18. Stopper clasps 22 are also provided in the openings of the lead wire grooves 21 to prevent the lead wires from falling out. Stopper clasps 22 are located on opposing sides of the openings of the lead wire grooves 21. Gaps between opposing stopper clasps 22 are made approximately equal to the lead wire thickness. These stopper clasps 22 allow lead wires to be easily inserted into lead wire grooves 21, but make it difficult for lead wires to fall out of lead wire grooves 21.

Lead wires are connected to pass bars 4 via fuses 8 for measurement of the voltage of each power module 1. Frame sections 3A are provided with fuse cavities 23 to retain fuses 8 in fixed positions. The fuse cavities 23 are made to connect with lead wire grooves 21. Guiding cut-outs 24 are provided in the partitions between fuse cavities 23 and pass bar insertion cavities 18 to run lead plates connecting fuses 8 and pass bars 4.

Further, frame sections 3A shown in FIGS. 26 and 27 are provided with sensor connecting plate insertion cavities 26 on their backside to hold sensor connecting plates 25 in fixed positions. Sensor connecting plate insertion cavities 26 are adjacent and parallel to pass bar insertion cavities 18 and on the outside of pass bar insertion cavities 18. In a frame section 3A shown in FIGS. 31 through 33, sensor connecting plate insertion cavities 26 also has stopper clasps 48 similar to pass bar insertion cavities 18, formed of single-piece construction in the openings, to prevent sensor connecting plates 25 from falling out.

Sensor connecting plates 25, which are inserted into sensor connecting plate insertion cavities 26, connect temperature sensors 13 fixed to power modules 1, in series. As shown in FIG. 2, sensor leads 14 project out from power modules 1 adjacent to electrode terminals 5. These sensor leads 14 connect with sensor connecting plates 25 to connect all temperature sensors 13 in series.

Frame sections 3A are provided with connecting holes 27 to allow passage of sensor leads 14 through the frame section 3A for connection with sensor connecting plates 25. Connecting holes 27 are opened adjacent to one end of each sensor connecting plate insertion cavity 26 and outboard of those insertion cavities 26. Sensor leads 14 projecting from power modules 1 pass through frame section 3A connecting holes 27, connect with sensor connecting plates 25, and connect all temperature sensors 13 in series. All temperature sensors 13, mutually connected in series, output their measurement signals to external devices via lead wires. If any temperature sensor 13 detects that battery temperature has risen abnormally high, a signal issued from that temperature sensor 13 is processed by an externally connected device such as a protection circuit. For example, an external protection circuit limits, or cuts-off battery 6 charge-discharge current to protect the batteries 6.

Frame sections 3A are provided with periphery walls 28 established around the periphery of a frame section 3A and projecting from its backside to hold a cover section 3B in a fixed position. A frame section 3A with periphery walls 28 can be layered with a cover section 3B to accurately fix the position of the cover section 3B with no slippage out of alignment. Further, both a cover section 3B and a water resistant cover 29 can be layered in fixed positions inside the periphery walls 28 for attachment to a frame section 3A. A configuration which connects and fixes the outside periphery of the water resistant cover 29 to the inside surface of the periphery walls 28 in a water resistant fashion has the characteristic that the end-plate 3 can be a reliable water resistant structure.

A cover section 3B is layered on, and fixed to a frame section 3A sealing open regions of pass bar insertion cavities 18, sensor connecting plate insertion cavities 26, and lead wire grooves 21. In this configuration the frame section 3A and cover section 3B sandwich the pass bars 4, sensor connecting plates 25, and lead wires to retain them in fixed positions. With the cover section 3B connected and fixed to the frame section 3A, the pass bars 4, sensor connecting plates 25, and lead wires are set in fixed positions and do not fall outside the end-plate 3. The outline of a cover section 3B is made approximately equal to the shape of the inside surface of the periphery walls 28 provided on a frame section 3A. A cover section 3B fits into the periphery walls 28 of a frame section 3A to fix its position and form a layered end-plate 3.

The cover section 3B shown in FIGS. 26 and 27 has windows 20 opened in the same positions as windows 20 provided through the frame section 3A. In this end-plate 3, windows 20 are opened in corresponding locations through both the frame section 3A and the cover section 313, and pass bars 4 housed within the end-plate 3 can be connected with power module 1 electrode terminals 5 via setscrews.

The cover section 3B is provided with guiding cut-outs 31 in its periphery to connect power module 1 sensor leads 14 to sensor connecting plates 25. The guiding cut-outs 31 are disposed outward of the windows 20. In addition, the cover section 3B is provided with projections, formed of single-piece construction, around the periphery and window 20 edges. These projections not only reinforce the cover section 3B, but also effectively prevent water or other fluid ingress through windows 20 or guiding cut-outs 31 into the inside of the end-plate 3.

The cover section 3B shown in FIGS. 26 and 27 has lead extraction openings 32A at both ends to extract lead wires from the end-plate 3. Lead wires set in lead wire grooves 21 are available externally from the extraction openings 32A.

Figure 37:
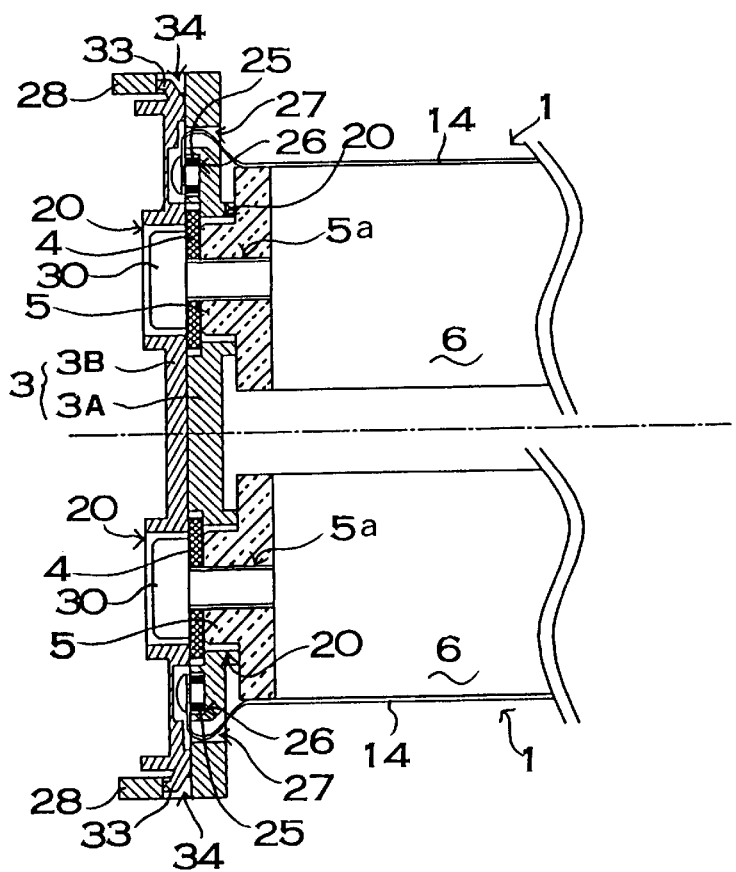
FIG. 37 is a cross-section view showing end-plate pass bar and power module connecting structure.

Stopper projections 33 of single-piece construction are provided on the periphery edge of the cover section 3B to allow insertion and connection of the cover section 3B into the periphery walls 28 of the frame section 3A. The cover section 3B shown in FIGS. 16 and 17 is formed in an overall rectangular shape with a plurality of stopper projections 33 protruding from each edge. Stopper depressions 34 are provided on the inside surface of the periphery walls 28 of the frame section 3A to mate with stopper projections 33. As shown in FIG. 37, stopper depressions 34 may also be through-holes provided in the periphery walls 28. As shown in FIG. 37, the cover section 3B is connected in a fixed position to the frame section 3A by fitting stopper projections 33 into stopper depressions 34. In the end-plate 3 of these figures, stopper projections 33 are provided in the cover section 3B and stopper depressions 34 are provided in the frame section 3A, but stopper projections 33 may be provided in the frame section 3A and stopper depressions 34 provided in the cover section 38 to also connect the cover section in a fixed position on the frame section. Further, stopper projections may be provided only on the inside edges of periphery walls of the frame section, and the cover section can be pushed in beyond these stopper projections to join the cover section to the frame section.

This type of snap-insertion structure described above has the characteristic that the cover section 38 and frame section 3A can be simply, easily, and quickly connected and disconnected. However, the cover section may also be connected with the frame section by a configuration including spot welds, local bonding, or screw connection, etc.

The water resistant cover 29, which is layered onto the backside surface of the cover section 313, is a plastic' plate, has an outline shape approximately equal to the shape of the inside of the periphery walls 28 of the frame section 3A, and has lead wire extraction guiding cut-outs 29A and power cord access holes 29B opened through it.

An end-plate 3 with the structure described above has a cover section 3B fixed to the backside of a frame section 3A with pass bars 4, sensor connecting plates 25, and fuses 8 disposed in specified positions on the frame section 3A. In this state, end-plates 3 are attached to a holder-case 2 holding power modules 1 in fixed positions. As shown in FIG. 37, setscrews 30 are inserted in cover section 3B windows 20 to connect end-plate 3 pass bars 4 to power module 1 electrode terminals 5. With the end-plates 3 connected to the holder case 2, pass bars 4 can be simply and efficiently connected with electrode terminals 5. However, end-plates 3 may also be connected and fixed to the holder-case 2 after connection of pass bars 4 with power module 1 electrode terminals 5.

An end-plate 3 with the structure described above connects a frame section 3A and a cover section 3B and holds pass-bars 4 therebetween. However, in a power source of the present invention, an end-plate is not necessarily comprised of the frame section and the cover section. For example, but not illustrated, an end-plate can be comprised of only a frame section without using the cover section. An end-plate of this structure has the characteristic that manufacturing cost can be considerably reduced due to a simple configuration. In an end-plate with only a frame section, the pass bar and sensor connecting plate are exposed on its outside. However, the exposed parts can be covered in an insulated state by fixing plastic water-resistant cover on the backside of the frame section.

Figure 38:
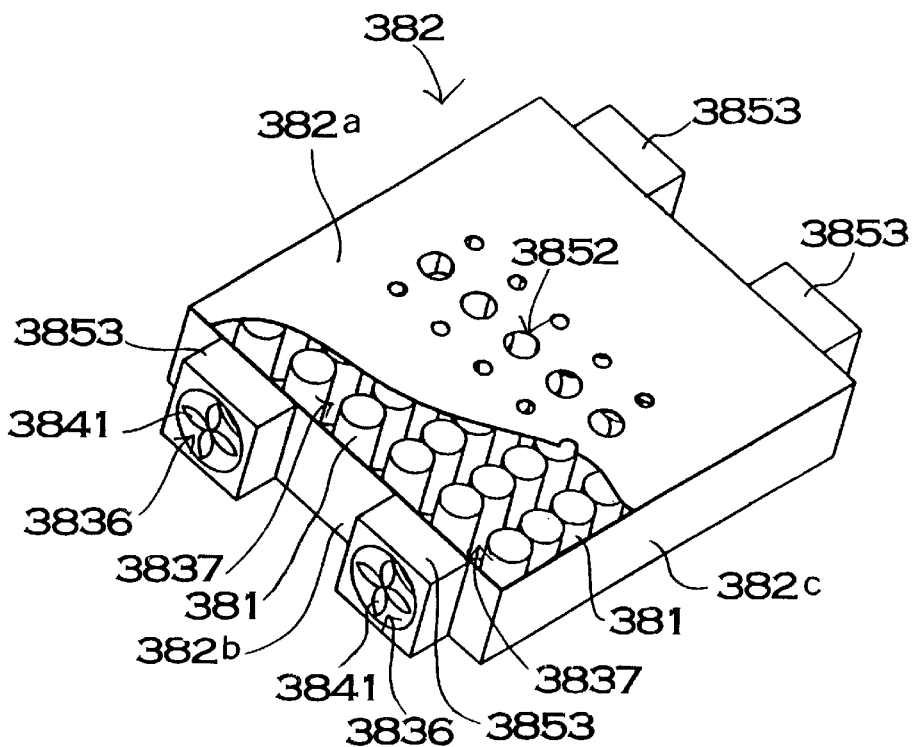
FIG. 38 is a perspective view of the power source of another embodiment of the present invention.
Figure 39:
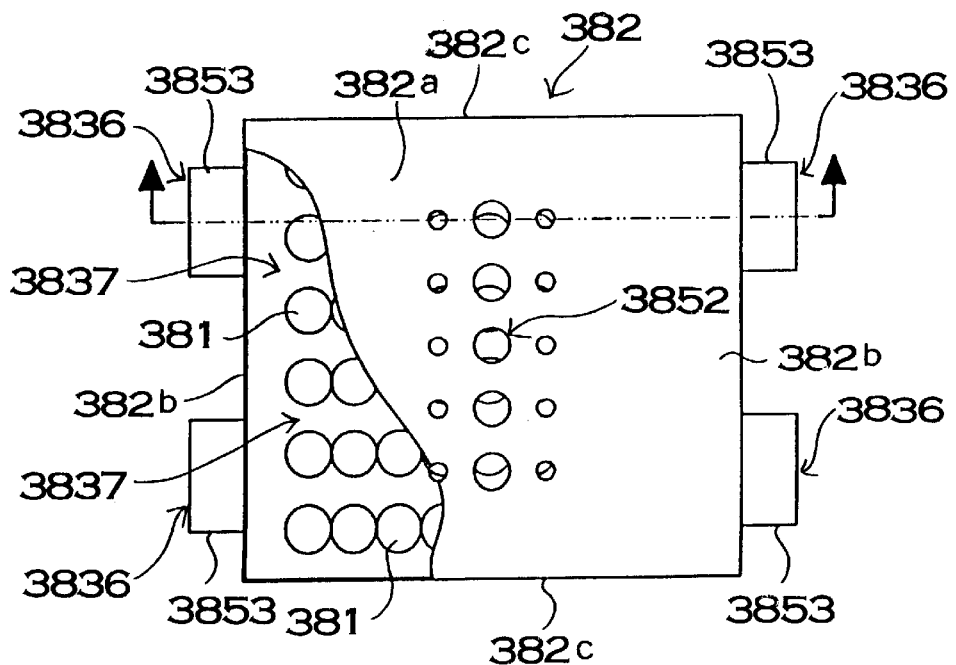
FIG. 39 is a plan view of the power source shown in FIG. 38.
Figure 40:
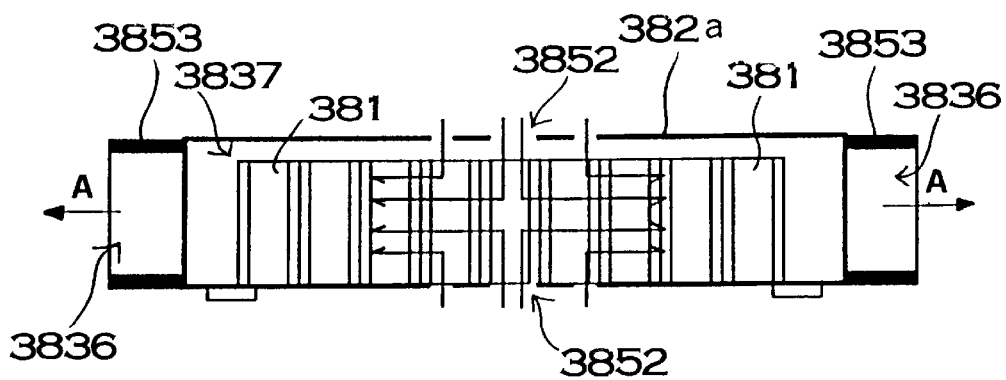
FIG. 40 is a cross-section view of the power source shown in FIG. 38.

Further, in a power source shown in FIGS. 38 through 40, a plurality of power modules 381 are housed in a holder-case 382. A power module 1 is comprised of a single cylindrical rechargeable battery or super-capacitor. Nickel-hydrogen batteries are suitable for rechargeable batteries used for power modules. However, nickle-cadmium batteries or lithium-ion batteries may also be used as the rechargeable batteries of the power modules.

Power modules may also be made up of a plurality of rechargeable batteries and super-capacitors connected in a straight line. A power module in the figure is one or two rechargeable batteries and super-capacitors connected in a straight line due to their short full length.

Figure 41:
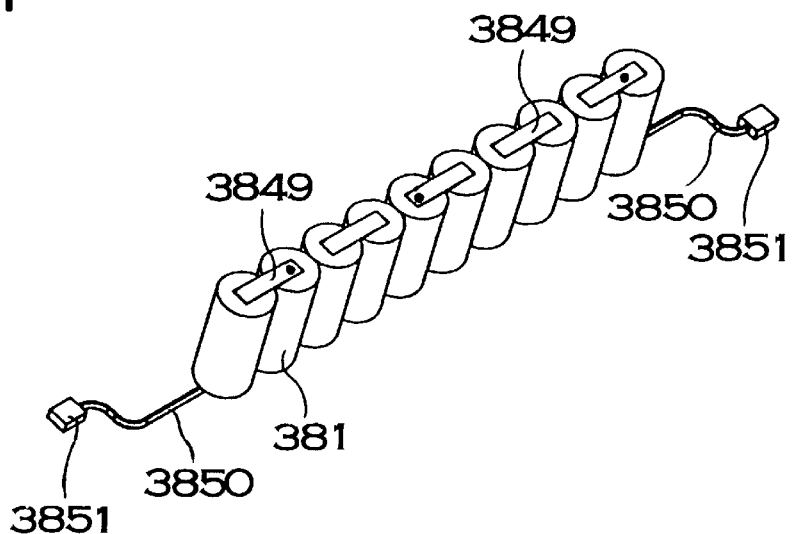
FIG. 41 is a perspective view of a power module housed in the holder-case.
Figure 42:
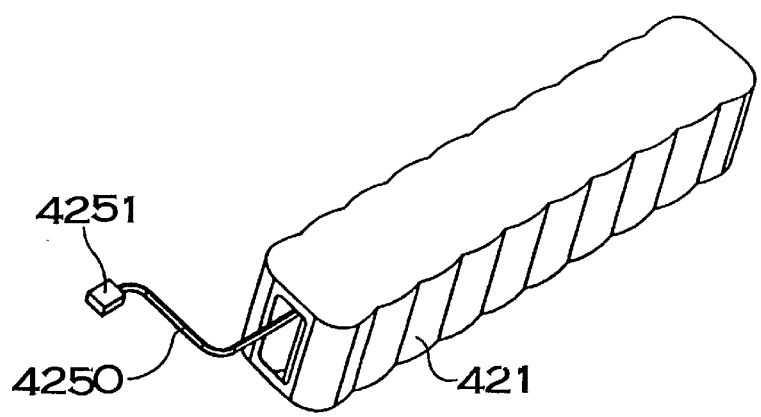
FIG. 42 is a perspective view showing an example of another power module housed in the holder-case.

Power modules 381 shown in FIG. 41 are connected in series via leads 3849 and formed into a group of batteries. The power modules 381 are housed in a holder-case 382 in a group-shape. As shown in FIG. 41, a group of batteries is made up of power modules 381 which are arranged in a parallel fashion and connected together via leads 3849. In a group of batteries of the figure, a plurality of power modules 381 are connected so as to locate on the same plane. Not illustrated, power modules in a group of batteries may also be connected together with in a slight zigzag-shape. Further, as shown in a group of batteries of FIG. 42, power modules 421 are connected in 2 rows to form gaps between the power modules 421.

A power source in which a group of batteries formed of power modules 381 are housed in a holder-case 382 can efficiently house many power modules 381 in the holder-case 382. For this reason, the power source can be assembled efficiently. Further, a power source of this structure has the characteristic of placing many power modules 381 in right positions since power modules 381 are connected with adjacent power modules via lead 3849.

Figure 43:
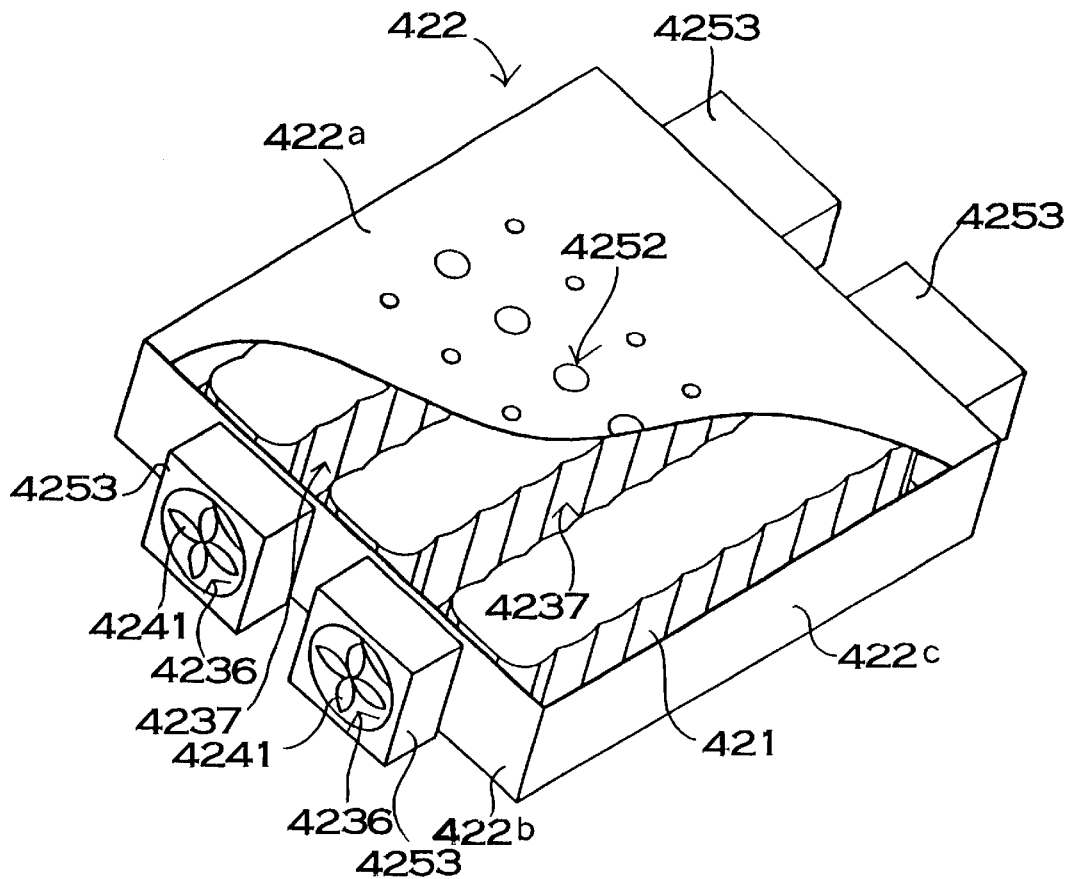
FIG. 43 is a perspective view of the power source housing the power modules shown in FIG. 42.

A power source shown in FIG. 38 has 6 rows of battery groups in a holder-case 382. Power sources shown in FIGS. 42 and 43 has 3 rows of power modules 421 connected in 2 rows. In addition, the same components of a power source as a power source of an embodiment shown in FIG. 38 are given the same signs in FIG. 43, but two figures from the top are eliminated. Each row of group of batteries is connected together in series via leads 3850, 4250 and connectors 3851, 4251. In a power source in which power modules are supercapacitors, all capacitors are connected in parallel via leads and connectors.

Not illustrated, a group of batteries is provided with temperature sensors fixed on the surface of each power module. The temperature sensors are devices which can measure the temperature of the power modules. Preferably, a PTC which senses temperature by changing electric resistance with temperature is used as a temperature sensor. Temperature sensors fixed on the surface of each power module are connected in series via sensor leads (not illustrated) and drawn to the outside.

As shown in FIG. 38, a holder-case 382 is provided with the top and bottom plates 382*a*, end plates 382*b* and side plates 382*c* which close the circumference of the top and bottom plates 382*a*. The holder-case 382 is provided with an air-duct formed by the top and bottom plates 382*a*, end plates 382*b* and side plates 382*c*, which is provided within the holder-case 382. In a holder-case 382 of this structure, the top and bottom plates 382*a* are separately formed of plastic and screw-fastened or adhere-connected to form an air-duct. The bottom plate 382*a* is formed of single-piece construction with the end plates 382*b* and side plates 382 to form in a box-shape with an open top. The top plate 382*a* is formed in a plate-shape. After housing power modules in the bottom plate 382*a* formed in a box-shape, the top plate 382*a* is connected with the bottom plate 382*a* in a manner allowing the top plate 382*a* to close an open top of the bottom plate 382*a*.

In the figure, the top and bottom plates 382*a* are provided with intermediate air-inlets 3852, and end plates 382*b* opposing each other are provided with airoutlets 3836. The intermediate air-inlets 3852 are provided in the middle of the top and bottom plates 382a so as to locate between the air-outlets 3836 of the end plates 382b. In a holder-case 382 shown in FIG. 40, intermediate air-inlets are opened in the top and bottom plates 382a.

The holder-case 382 is provided with a gap to allow air flow to develop between power modules 381 fixed on the surface of the bottom plate 382a and the top plate 382. In a holder-case 382 having this structure, power modules 381 disposed in an air-duct 3837 can be cooled efficiently by passing air between the power modules 381 and the top plate 382a. However, in the power source of the present invention, power modules may also be provided in an air-duct by getting the power modules in contact with the inner surfaces of the top and bottom plates. These types of power modules are cooled by passing air between the batteries.

Power modules 381 in which batteries are in a perpendicular posture to the top and bottom plates 382a are fixed to a holder-case 382. A power source in which power modules 381 in this posture are housed in the holder-case 382 can efficiently cool the power modules 381 by passing air through the air-duct 3837. However, in the power source of the present invention, power modules are not necessarily in this posture. For example, it is possible that power modules are provided in the holder-case in a parallel posture to the top and bottom plates.

Holder-cases 382 shown in FIGS. 38 and 39 compulsorily cool power modules 381 housed in air-duct 3837 by passing air through in the direction of an arrow A described in FIG. 40. To pass air through in the direction of the arrow, air-outlets 3836 of end plates 382b are provided with cooling fans 3841. The cooling fans 3841 suck air from the air-outlets 3836 and compulsorily move the airthrough the air-duct 3837. The air-outlet duct 3853 is formed of a single-piece construction with the end plates 382b and connected with cooling fans.

To cool all power modules housed in an air-duct equally, intermediate air inlets are opened through the top and bottom plates 382a in the middle of airoutlets 3836. A holder-case of the FIG. 382 is provided with a plurality of intermediate air-inlets 3852 in the top and bottom plates 382a. Further, the holder-case of the figure is provided with a plurality of different size intermediate air-inlets 3852, which are lined up in 3 rows, in the top and bottom plates 382a which are different in size. Large intermediate air-inlets 3852 are provided in the middle row and small intermediate air-inlets 3852 are provided in 2 rows on both sides of the large intermediate air-inlets 3852. A holder-case 382 of this structure has the feature that power modules 381 housed in an air duct 3837 can be cooled equally.

A holder-case 382 shown in the figure is provided with many intermediate air-inlets 3852 in a circle-shape. However, intermediate air-inlets may also be formed in a slit-shape. The slit-shaped intermediate air-inlets are formed wide in the middle row and narrow at both ends to cool power modules housed in an air-duct equally.

Besides an opening area of intermediate air-inlets, the density of intermediate air-inlets may also be changed to cool power modules housed in an air-duct equally. For example, in this holder-case, many intermediate air-inlets are opened densely in the middle of the holder-case to supply much air to an air-duct and opened sparsely on both sides of them to reduce the amount of air flowing into both sides of the air-duct and thereby power modules in the air-duct can be cooled equally.

A holder-case 382 of this structure sucks in air due to air-outlets 3836 by means of cooling fans 3841, and passes the air through an air-duct 3837, which is disposed in the holder-case 382. Cold air, which is sucked in through intermediate air-inlets 3852 connected in the middle of the air-duct 3837, passes through the air-duct separating to both sides to cool power modules 381 and is discharged from the air-outlets 3836.

The holder-case 382 having this structure has the feature that power modules 381 can be cooled efficiently by forming the holder-case 382 thinly. This is because cooling fans 3841 are connected with air-outlets 3836. However, in a power source of the present invention, air-outlets 3836 are not necessarily connected with cooling fans 3841. For example, power modules 381 can be cooled by letting air current generated by driving automobiles flow into intermediate air-inlets.

Figure 44:
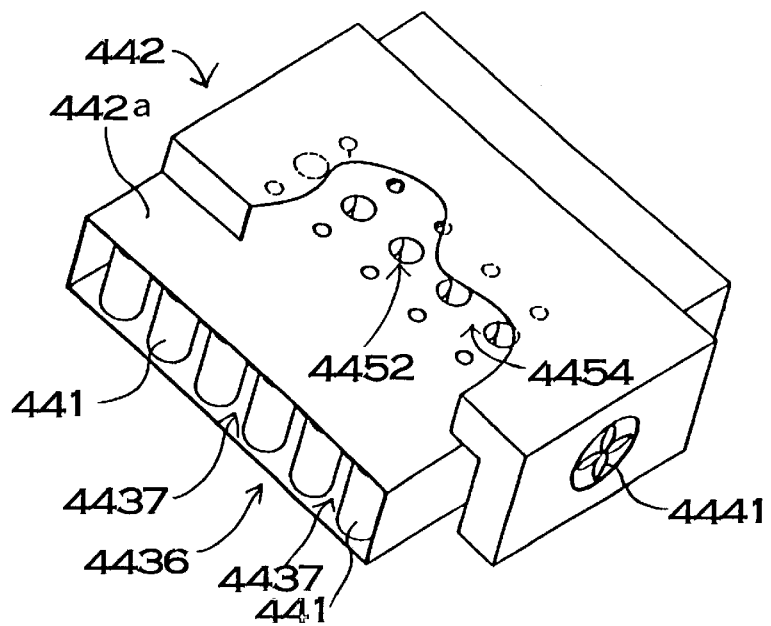
FIG. 44 is a perspective view showing another embodiment of the power source of the present invention.
Figure 45:
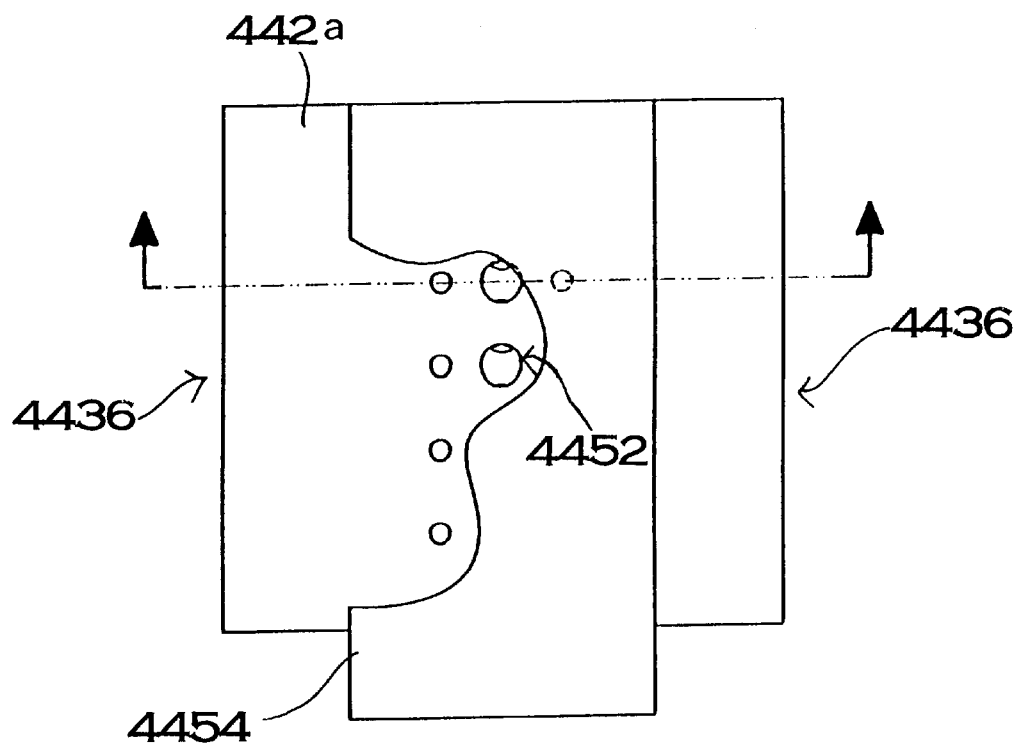
FIG. 45 is a plan view of the power source shown in FIG. 44.
Figure 46:
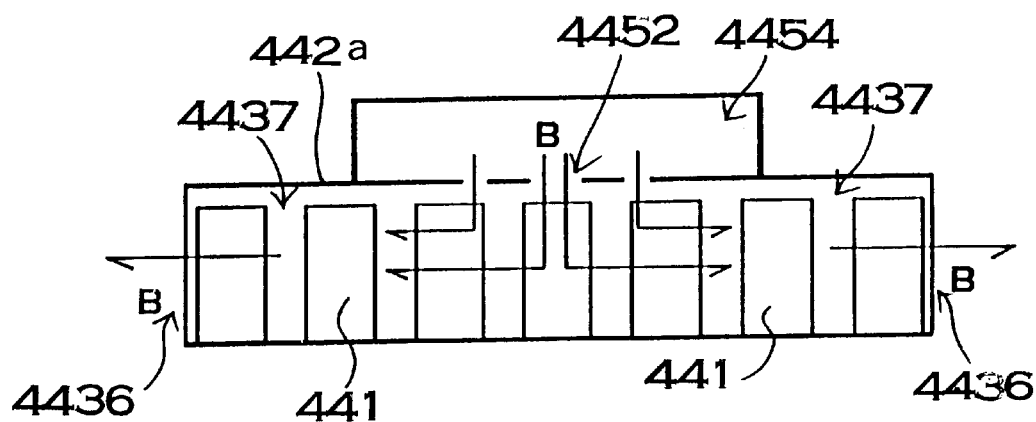
FIG. 46 is a cross-section view of the power source shown in FIG. 44.

Further, in power sources shown in FIGS. 44 through 46, power modules 441 are cooled by sending air to intermediate air-inlets of a holder-case 442 by means of a cooling fan 442. A holder-case 442 of this structure is provided with an air supplying duct 4454 on the outside of intermediate air-inlets 445 which is connected with a cooling fan 4441 for sending air to the air supplying duct 4454. The cooling fan 4441 inhales cold air and supply it to the air supplying duct 4454. Air supplied from the air supplying duct 4454 is compulsorily sent to the air-duct 4437 through intermediate air-inlets.

A power source of these figures are provided with intermediate air-inlets 4452 opened in the top plate 442a only and an air supplying duct 4454 connected with the intermediate air-inlets 4452. In a power source of this structure, air flows in the direction indicated by arrows B described in FIG. 46. Namely, air is supplied to the air supplying duct 4454 by means of the cooling fan 4441. The air of the air supplying duct 4454 passes through the intermediate air-inlets 4452 and flows into the air-duct 4437. The air flow separates to both sides of the air-duct 4437 to cool power modules 441 and is discharged from the airoutlets 4436 which are opened at both ends.

In a holder-case 442 of this figure, an air supplying duct 4454 is connected with the top plate 442a only. However, an air supplying duct can be connected with both the top and bottom plates to supply air to an air-duct. The top and bottom plates 442a connected with the air supplying duct 4454 is provided with intermediate air-inlets 4452 for sending air from the air supplying duct 4454 to the air-duct 4437.

A holder-case 442 is used as a power source with single-piece construction components or as a power source connecting power modules 441 housed in a plurality of holder-cases 442. In a power source with a plurality of holder-cases, the holder-cases are layered in a vertical fashion. Holder-cases layered vertically are connected by sandwiching a vibration-proof rubber therebetween and absorbing vibration from each other. Further, a power source using the holder-case with single-piece construction components is also provided with vibration-proof rubber on its bottom. For example, when a power source is attached to automobiles, the vibration-proof rubber can absorb vibration.

In a power source with a plurality of holder-cases layered vertically, power modules housed in each holder-case can be cooled efficiently by air supplying ducts disposed between the layered holder-cases.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A power source comprising:

a plurality of power modules; and a holding case, said power modules being arranged in a parallel manner in said holding case, said holding case including:
- a main inlet port on a first side of said holding case;
- an outlet port on a second side of said holding case;
- an air duct formed in said holding case between said inlet port and said outlet port so as to allow air to pass through said holding case to cool said power modules;
- a plurality of intermediate air inlets arranged along said air duct so as to allow air to enter into said air duct between said main inlet port and said outlet port; and
- a plurality of air-direction controlling protrusions extending from an inside surface of said holding case, each of said air-direction controlling protrusions having an end edge extending into a gap formed between adjacent power modules in said holding case, each of at least some of said air-direction controlling protrusions having one of said intermediate air inlets formed along said end edge thereof.

2. The power source of claim 1, wherein each of said at least some of said air-direction controlling protrusions have one of said intermediate air inlets formed at a leeward side of said end edge thereof.

3. The power source of claim 1, wherein each of said at least some of said air-direction controlling protrusions have one of said intermediate air inlets formed at said end edge thereof.

4. The power source of claim 1, wherein said holding case comprises:

a first side cover casing;

a second side cover casing, said air-direction controlling protrusions being formed on an inside surface of said first side cover casing and said second side cover casing; and an intermediate casing arranged between said first side casing and said second side casing.

5. The power source of claim 4, wherein each of said first side cover casing and said second side cover casing has holder ribs formed on an inside surface thereof, and said intermediate casing has holder ribs on opposite surfaces thereof, wherein said first side cover casing, said second side cover casing, and said intermediate casing are arranged so as to sandwich and retain said power modules between said holder ribs.

6. The power source of claim 5, wherein said first side cover casing, said second side cover casing, and said intermediate casing are arranged such that said holder ribs divide said air duct into a plurality of air duct rows.

7. The power source of claim 5, further comprising a shock absorbing gasket between each of said holder ribs and said power modules.

8. The power source of claim 1, further comprising a cooling fan having an inlet side connected to said outlet port of said holding case so as to generate a flow of air through said air duct to cool said power modules.

9. The power source of claim 1, further comprising a power source box accommodating said holding case such that an outer air duct is formed between said power source box and said holding case, said intermediate air inlets located so as to communicate with said outer air duct.

10. The power source of claim 1, further comprising a plurality of holding cases vertically layered so as to form an intermediate air duct between said holding cases, said intermediate air inlets of at least some of said holding cases communicating with said intermediate air duct.

11. The power source of claim 1, wherein said power modules comprise one of nickel-hydrogen batteries, nickel-cadmium batteries, and lithium-ion rechargeable batteries.

* * * * *